United States Patent
Dixon et al.

(10) Patent No.: US 11,907,300 B2
(45) Date of Patent: Feb. 20, 2024

(54) GEOLOGIC FORMATION OPERATIONS RELATIONAL FRAMEWORK

(71) Applicant: Schlumberger Technology Corporation, Sugar Land, TX (US)

(72) Inventors: Todd Christopher Dixon, Pune (IN); Andrei Ionescu, Pune (IN); Sanjeet Khanuja, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/947,023

(22) Filed: Jul. 15, 2020

(65) Prior Publication Data
US 2021/0019351 A1 Jan. 21, 2021

(30) Foreign Application Priority Data
Jul. 17, 2019 (IN) .............................. 201921028840

(51) Int. Cl.
*G06F 16/903* (2019.01)
*G06F 16/9038* (2019.01)

(52) U.S. Cl.
CPC .... *G06F 16/90335* (2019.01); *G06F 16/9038* (2019.01)

(58) Field of Classification Search
None
See application file for complete search history.

(56) References Cited

U.S. PATENT DOCUMENTS

| 11,070,579 | B1 * | 7/2021 | Kiernan | H04L 63/20 |
| 2003/0115017 | A1 * | 6/2003 | Sun | G06F 18/2415 |
| | | | | 702/181 |
| 2004/0168827 | A1 * | 9/2004 | Jeffryes | E21B 44/00 |
| | | | | 175/48 |
| 2008/0179094 | A1 * | 7/2008 | Repin | E21B 44/00 |
| | | | | 175/50 |
| 2008/0263465 | A1 * | 10/2008 | Fox | G06F 16/29 |
| | | | | 715/764 |
| 2009/0020284 | A1 * | 1/2009 | Graf | E21B 44/00 |
| | | | | 166/250.15 |
| 2009/0225630 | A1 * | 9/2009 | Zheng | E21B 47/00 |
| | | | | 367/81 |
| 2010/0017349 | A1 * | 1/2010 | Chbat | G06N 7/01 |
| | | | | 706/12 |
| 2010/0088082 | A1 * | 4/2010 | Ingham | E21B 43/14 |
| | | | | 703/10 |
| 2012/0158761 | A1 * | 6/2012 | Aamodt | G16Z 99/00 |
| | | | | 707/758 |

(Continued)

FOREIGN PATENT DOCUMENTS

| WO | WO-2018034656 A1 * | 2/2018 | ......... G06F 3/04812 |
| WO | WO-2018165124 A1 * | 9/2018 | ............ E21B 44/00 |

OTHER PUBLICATIONS

Deterministic and Probabilistic Implementation of Context, Brdiczka et al.(Year: 2006).*

*Primary Examiner* — Augustine K. Obisesan
(74) *Attorney, Agent, or Firm* — Jeffrey D. Frantz

(57) ABSTRACT

A method can include accessing data generated during field operations; generating a graph that includes vertices and edges using at least a portion of the data, where the edges represent relationships between vertices; and generating a query result using the graph responsive to receipt of a query.

20 Claims, 21 Drawing Sheets

(56) References Cited

U.S. PATENT DOCUMENTS

| | | | | |
|---|---|---|---|---|
| 2013/0080464 | A1* | 3/2013 | George | G06F 16/242 |
| | | | | 707/769 |
| 2014/0070956 | A1* | 3/2014 | Winkler | E21B 44/00 |
| | | | | 340/870.01 |
| 2014/0118350 | A1* | 5/2014 | Imhof | G06T 15/08 |
| | | | | 345/424 |
| 2014/0277752 | A1* | 9/2014 | Chang | E21B 44/00 |
| | | | | 700/275 |
| 2014/0299377 | A1* | 10/2014 | Abbassian | E21B 47/005 |
| | | | | 175/40 |
| 2015/0213380 | A1* | 7/2015 | Cooper | G06Q 50/06 |
| | | | | 705/7.11 |
| 2016/0053603 | A1* | 2/2016 | Israel | E21B 47/00 |
| | | | | 702/6 |
| 2016/0328433 | A1* | 11/2016 | Wang | G06F 16/2465 |
| 2018/0156934 | A1* | 6/2018 | Strang | G01V 99/005 |
| 2018/0258760 | A1* | 9/2018 | Kashikar | E21B 33/134 |
| 2020/0109618 | A1* | 4/2020 | Flanagan | E21B 7/10 |

\* cited by examiner

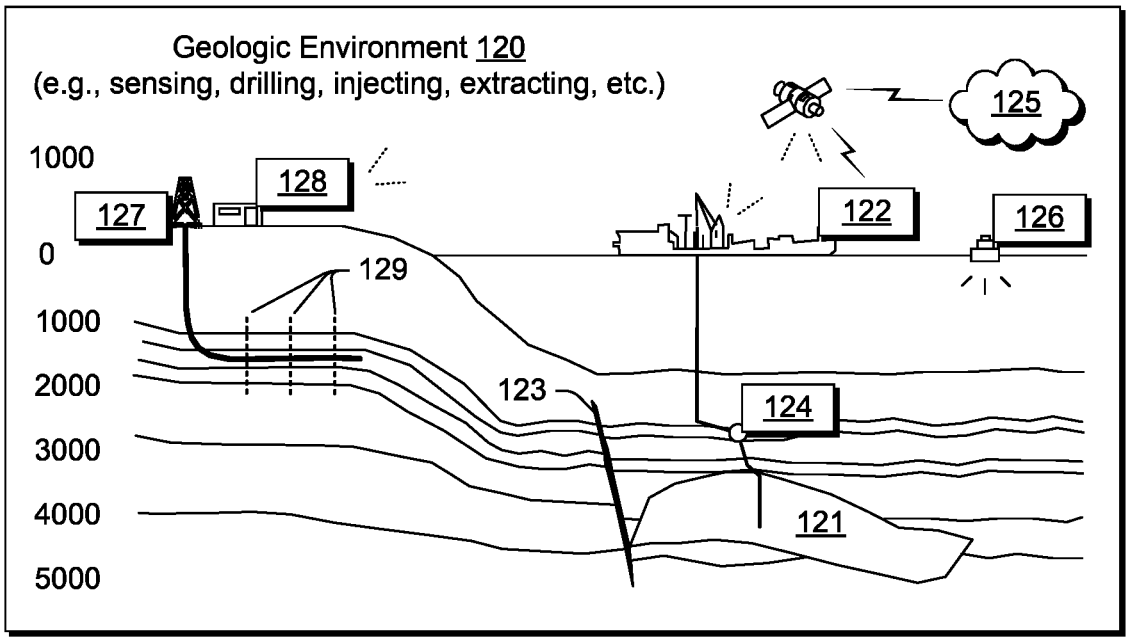
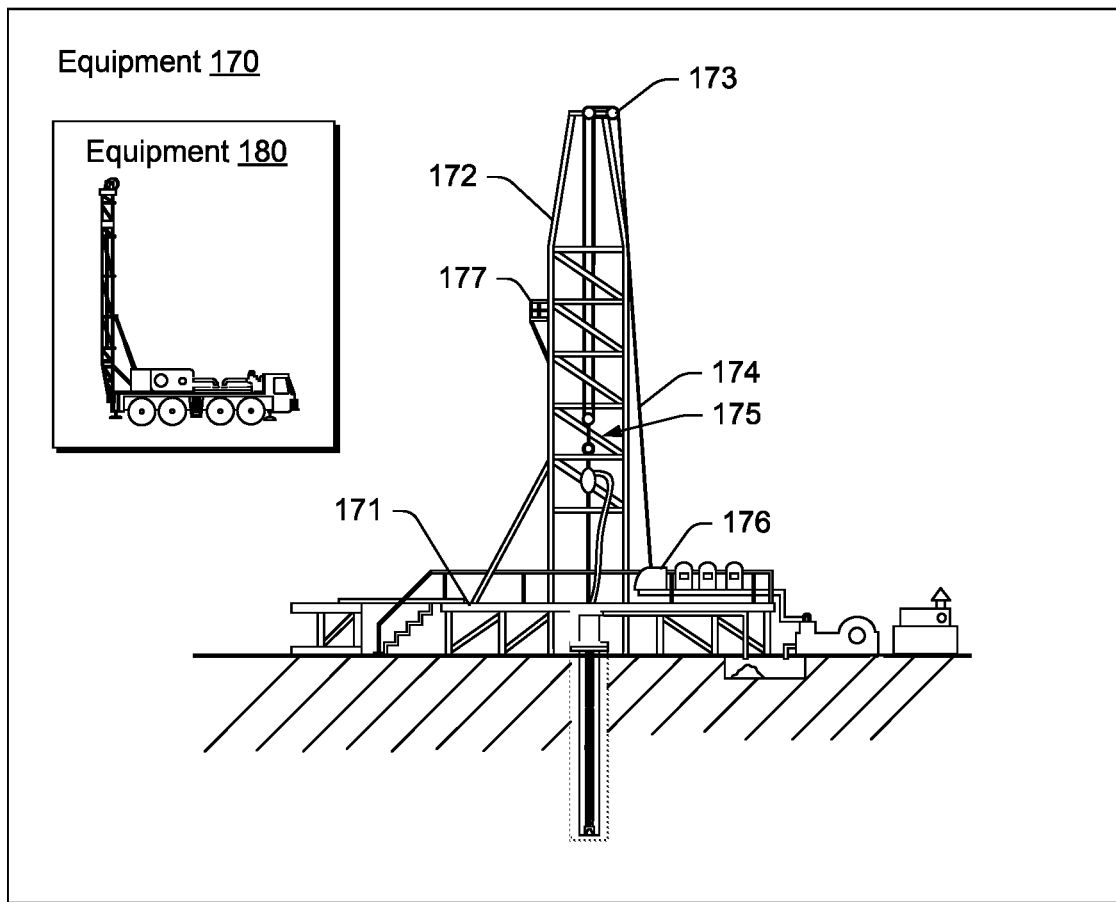
Fig. 1

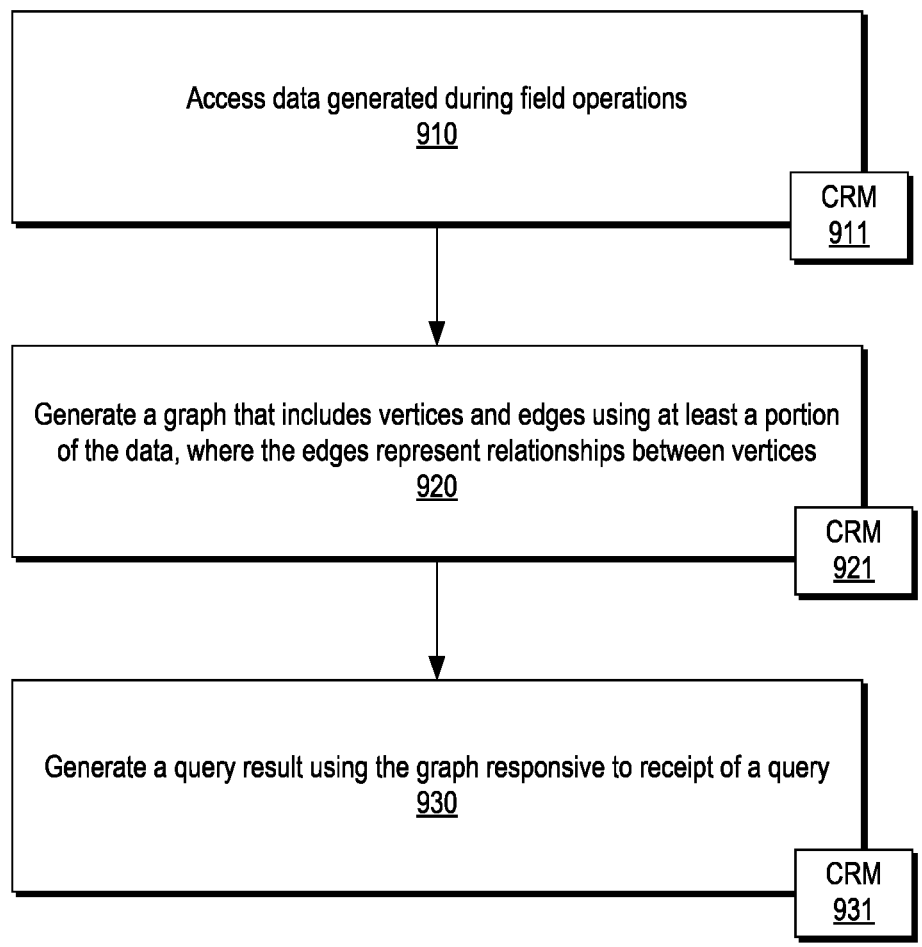
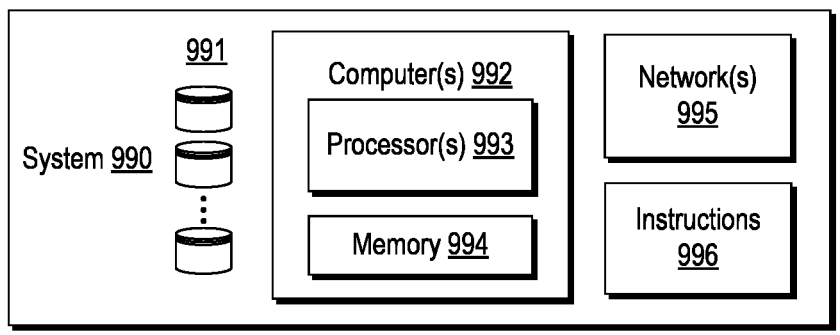
Fig. 9

GUI 1000

| Known Entity Name | WKA_Name | PS Well Attr. | WellDB Attr. | XYZ Attr. |
|---|---|---|---|---|
| Wellbore | UWI | UWI | WellName | Well_Number |
| Wellbore | Well_Name | Well_Name | API | Apino |
| Wellbore | API | | Country | |
| Wellbore | Country | Country | State | |
| Wellbore | State | | GRID4 | |
| Wellbore | Section | | GRID2 | |
| Wellbore | Township | | GRID3 | |
| Wellbore | Range | | | |
| Wellbore | Surface Lat. | Top_Y | Lat | Lat |
| Wellbore | Surface Long. | Top_X | Long | Long |
| Wellbore | Creation Date | Insert_Date | DateCreated | |
| Wellbore | Modify Date | | LastModified | |
| Wellbore | Field | Field | Field | Field |
| Wellbore | Operator | Operator | OriginalOperator | Operator |
| Wellbore | Spud Date | Spud_Date | SpudDate | |
| Wellbore | Current Status | Current_Stat | WellStatus | Status |
| Wellbore | Class | Class | WellType | Well_Class |
| Wellbore | Total Depth | | MeasDepth | Total_Depth |
| Wellbore | TVD | | TrueVertDepth | |
| Wellbore | Well ID | | ID | |

Fig. 10

GUI 1500

| CurrentOperator | OriginalOperator | Field | County | State | Country |
|---|---|---|---|---|---|
| Texas ARC | Sun | Big Wells | Dimmit | TX | USA |
| Murph | Murph | Briscoe | Dimmit | TX | USA |
| GWS | Express | Rocky | Dimmit | TX | USA |
| CO LLC | CO Inc | Briscoe | Dimmit | TX | USA |
| SPC | SPC | Rocky | Dimmit | TX | USA |
|  |  |  | Dimmit | TX | USA |
|  | Sun | Pearsall | Dimmit | TX | USA |
|  |  |  | Dimmit | TX | USA |
| TOC | TOC |  | Dimmit | TX | USA |
| AEO | AEO | Briscoe | Dimmit | TX | USA |
| GRI | GRI | HGL | Dimmit | TX | USA |
| AEO | AEO | Briscoe | Dimmit | TX | USA |
| AEO | AEO | Briscoe | Dimmit | TX | USA |
| CO LLC | CO Inc |  | Dimmit | TX | USA |
| CO Inc | CO Inc |  | Dimmit | TX | USA |

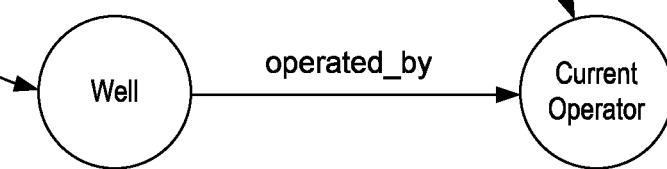

Fig. 15

GUI 1900

$ MATCH (d:doc. (docType: "ABC"))-[Has_Doc.]-(w:wellBore)-[r:Crosses_Form.]-
(f:form.) Where r.PHI<0.2 AND f.name= "Form. C" RETURN d:

Rows | *(3) | document(3)

Text

Code

Graph

Well Report O    Well Report D

Well Report G

Displaying 3 nodes (vertices) and 0 relationships (edges)    Auto-Complete On Off

Fig. 19

GEOLOGIC FORMATION OPERATIONS RELATIONAL FRAMEWORK

This application claims the benefit of India Patent Application No. 201921028840 filed on Jul. 17, 2019, and is hereby incorporated by reference in its entirety.

BACKGROUND

Various field operations can be performed with respect to a geologic formation. Such operations can include exploration operations, development operations, production operations, etc., with respect to a reservoir in the geologic formation.

As an example, an operation can be a seismic survey that utilizes equipment to acquire a seismic data set as measured and recorded with reference to a particular area of the Earth, for example, to evaluate a subsurface formation. A seismic survey can be acquired using one or more of surface, ocean/sea bottom, marine, borehole, land or other technology. A seismic survey can acquire a seismic data set or sets, which can be spatial (e.g., 1D, 2D or 3D) or spatial and temporal (e.g., 1D, 2D or 3D in space and 1D in time). Seismic data can be visualized by processing and rendering to a display where an interpreter can identify and select boundaries that can are representative of structure(s) in the Earth (e.g. reflectors, etc.).

As an example, an "Earth model" may be constructed using interpreted seismic data and optionally one or more other types of data. For example, consider constructing an Earth model that represents a reservoir using seismic data and exploratory borehole data and performing a simulation of physical phenomena (e.g., fluid flow, etc.) using a reservoir simulator. Results of a simulator can indicate a possible target that may be reached by drilling a borehole into the formation where the borehole can be completed to form a well that can produce fluid from the reservoir.

As an example, an operation can be a drilling operation where a borehole can be drilled into a geologic formation where the bore may be utilized to form a well. As an example, an operation can be a logging operation, which may be a wireline logging operation, a logging while drilling operation or another type of logging operation. After a borehole is formed by drilling, a formation is exposed via the borehole, which provides an opportunity to utilize one or more logging tools to acquire measurements (e.g., via sensors) that can be processed to determine properties of the formation (e.g., rock properties, fluid properties, etc.). As an example, logging may be performed before, during or after casing, cementing, fracturing, treating, etc. As an example, a cased-hole logging tool may include equipment to measure fluid flow rates and/or one or more other production parameters in a wellbore or, for example, to examine integrity of a casing and/or cement.

A rig can be a system of components that can be operated to form a borehole in a geologic formation, to transport equipment into and out of a bore in a geologic formation, etc. As an example, a rig may include a system that can be used to drill a bore and to acquire information about a geologic formation, drilling, etc. As an example, a rig configured for drilling can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform. As an example, a rotary steerable system (RSS) can be utilized to drill directionally. An RSS can include a bottom hole assembly (BHA) that includes features that provide for directional drilling. As an example, a rig or other surface equipment (e.g., onshore or offshore) may be utilized to perform one or more other types of operations, which can include logging operations.

SUMMARY

A method can include accessing data generated during field operations; generating a graph that includes vertices and edges using at least a portion of the data, where the edges represent relationships between vertices; and generating a query result using the graph responsive to receipt of a query. A system can include a processor; memory accessible to the processor; processor-executable instructions stored in the memory and executable by the processor to instruct the system to: access data generated during field operations; generate a graph that includes vertices and edges using at least a portion of the data, where the edges represent relationships between vertices; and generate a query result using the graph responsive to receipt of a query. One or more computer-readable storage media can include computer-executable instructions executable to instruct a computing system to: access data generated during field operations; generate a graph that includes vertices and edges using at least a portion of the data, where the edges represent relationships between vertices; and generate a query result using the graph responsive to receipt of a query. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;

FIG. 9 illustrates an example of a method;

FIG. 10 illustrates an example of a graphical user interface;

FIG. 15 illustrates an example of a graphical user interface;

FIG. 19 illustrates an example of a graphical user interface;

DETAILED DESCRIPTION

Figure 2:
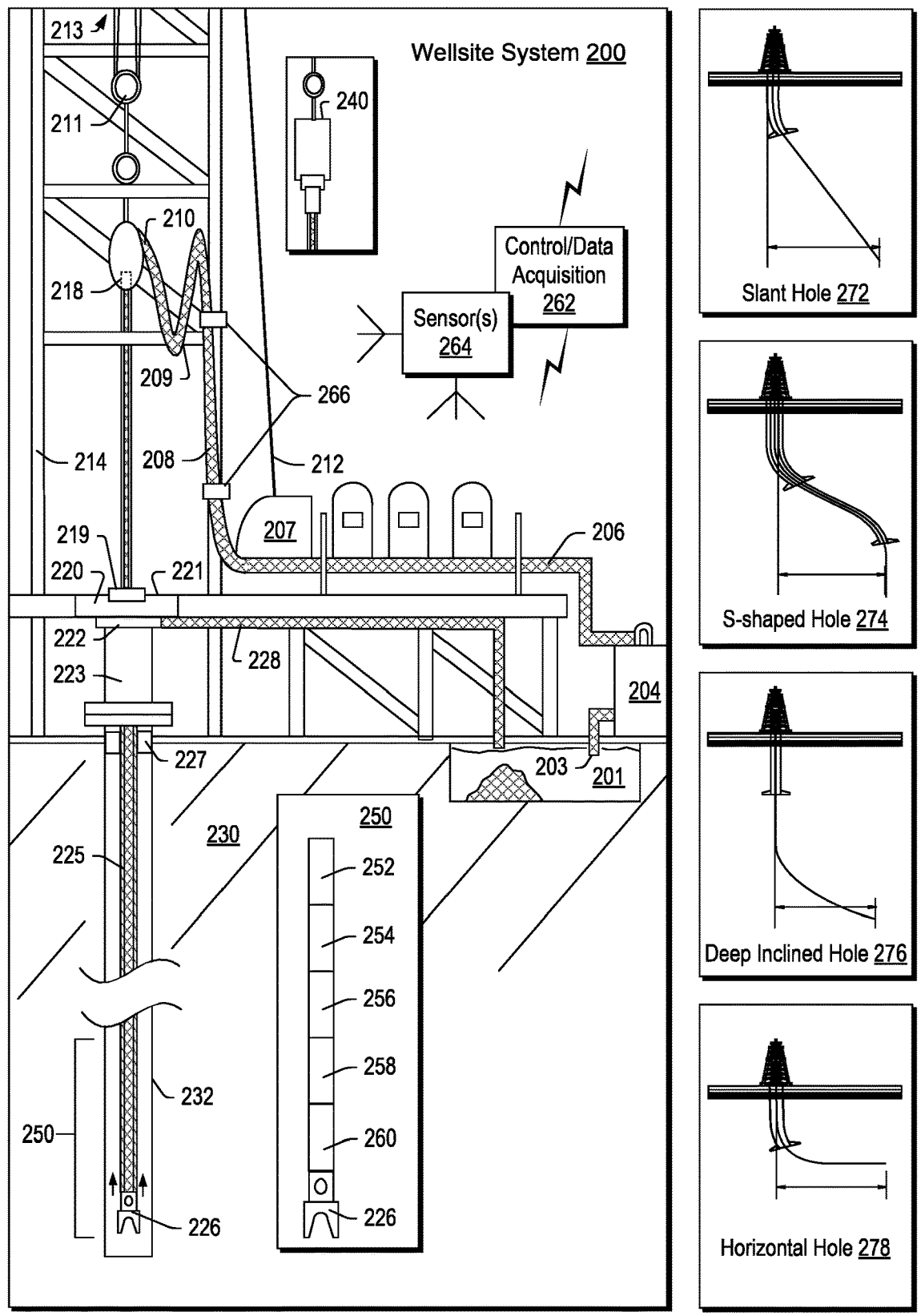
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle;

noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to a RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM can operate in a so-called sliding mode, when the drillstring is not rotated from the surface.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

Figure 3:
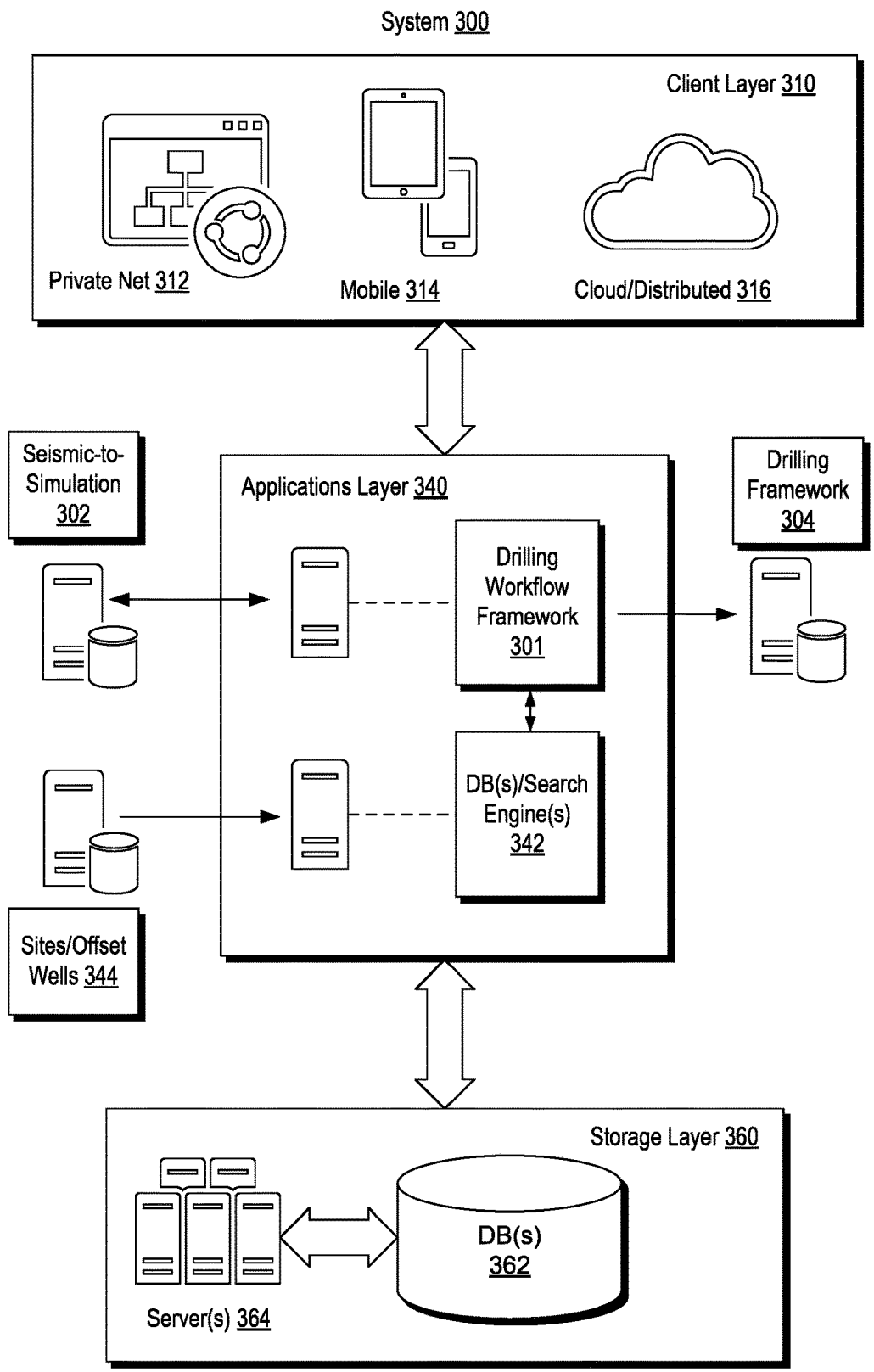
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules.

As an example, the database management component 342 can include one or more search engine modules that provide for searching one or more information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 362. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 340 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE architecture (Microsoft Corporation, Redmond, WA). As an example, a cloud portal block can include one or more features of an AZURE portal that can manage, mediate, etc. access to one or more services, data, connections, networks, devices, etc. As an example, the system 300 may include features of the GOOGLE cloud architecture (Google, Mountain View, CA).

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
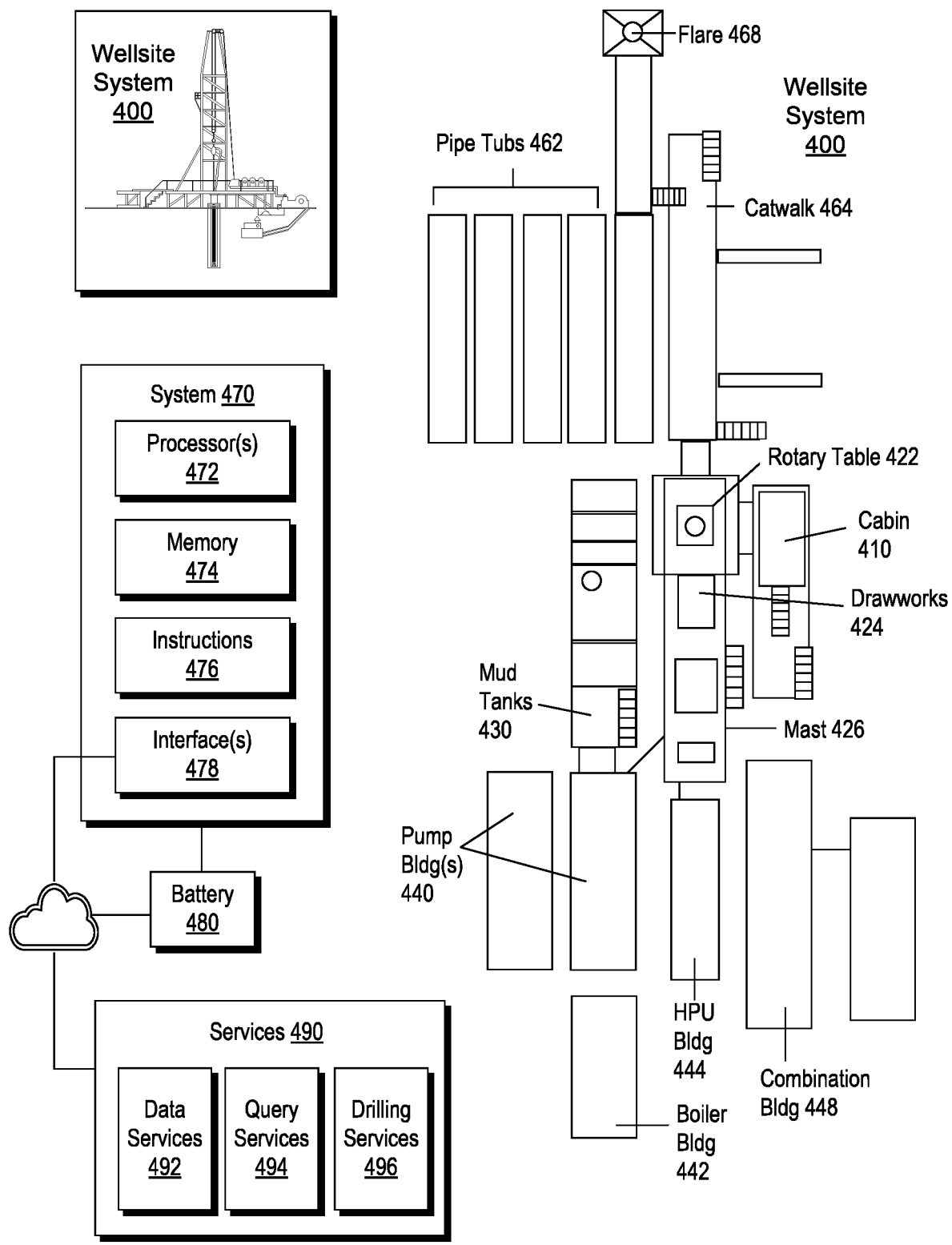
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measurement-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
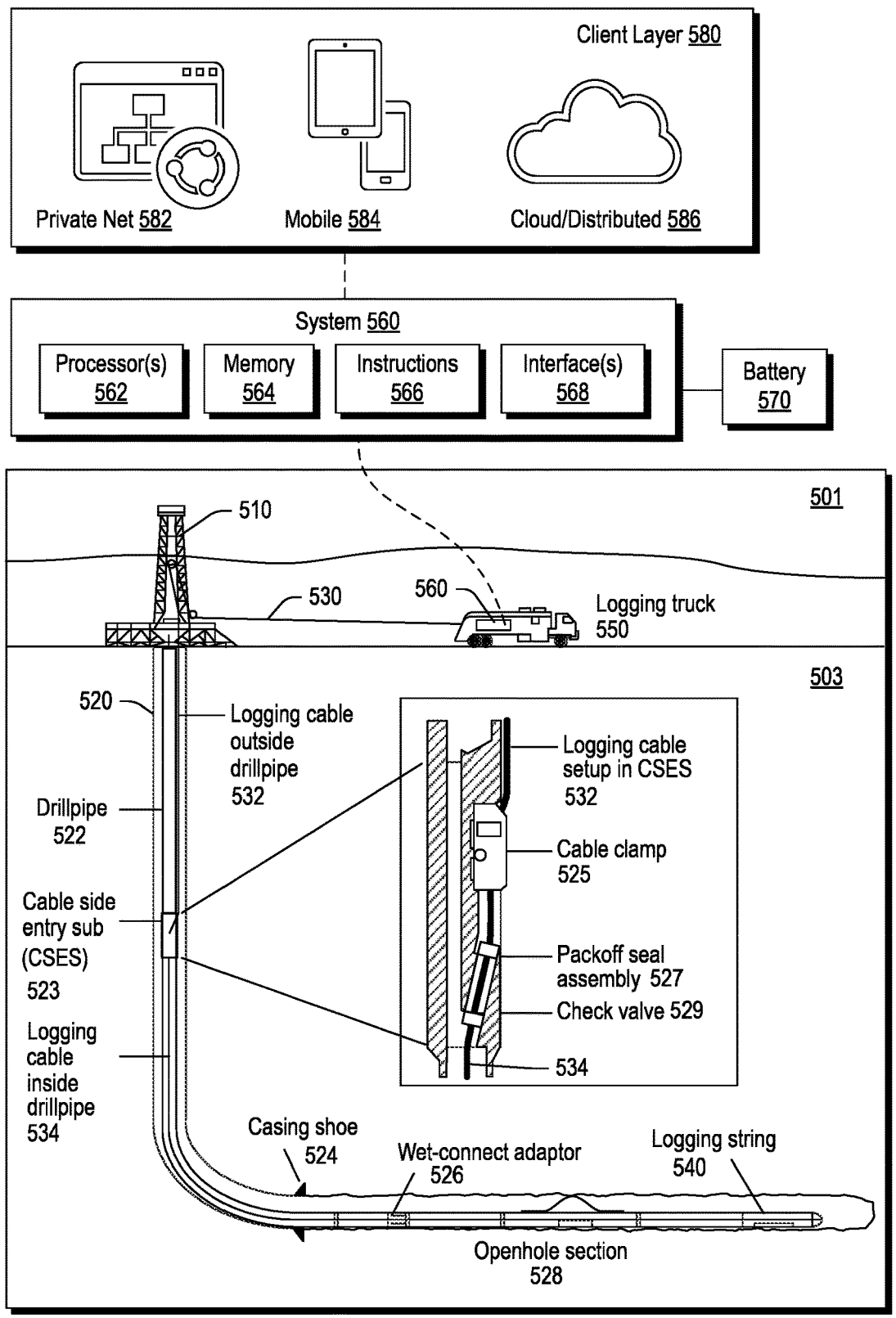
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
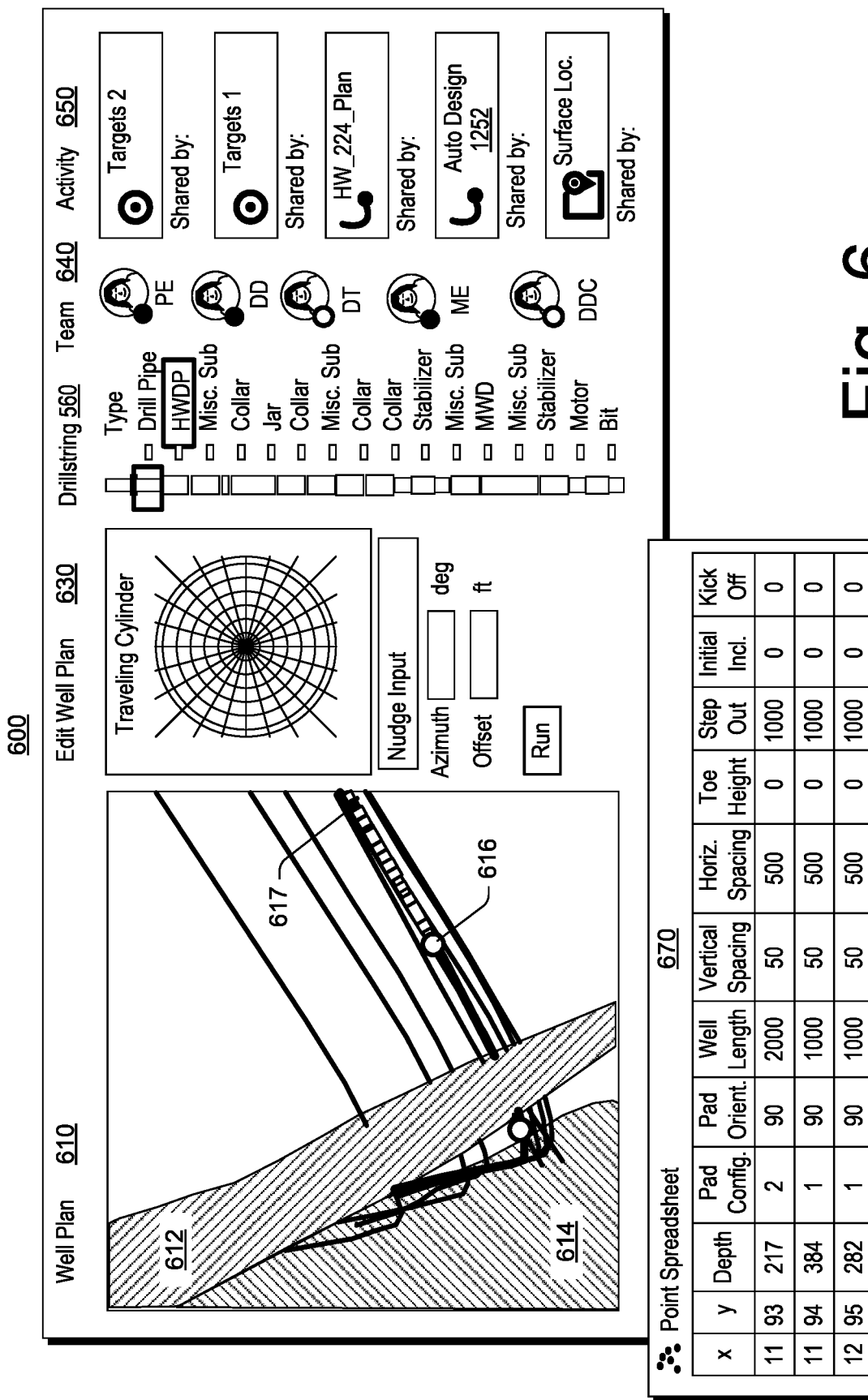
FIG. 6 illustrates an example of a graphical user interface.

FIG. 6 shows an example of a graphical user interface (GUI) 600 that includes information associated with a well plan. Specifically, the GUI 600 includes a panel 610 where surfaces representations 612 and 614 are rendered along with well trajectories where a location 616 can represent a position of a drillstring 617 along a well trajectory. The GUI 600 may include one or more editing features such as an edit well plan set of features 630. The GUI 600 may include information as to individuals of a team 640 that are involved, have been involved and/or are to be involved with one or more operations. The GUI 600 may include information as to one or more activities 650. As shown in the example of FIG. 6, the GUI 600 can include a graphical control of a drillstring 660 where, for example, various portions of the drillstring 660 may be selected to expose one or more associated parameters (e.g., type of equipment, equipment specifications, operational history, etc.). FIG. 6 also shows a table 670 as a point spreadsheet that specifies information for a plurality of wells. For example, the point spreadsheet can include coordinates, dimensions, etc., that specify a trajectory of a well, spacing of wells, etc.

Figure 7:
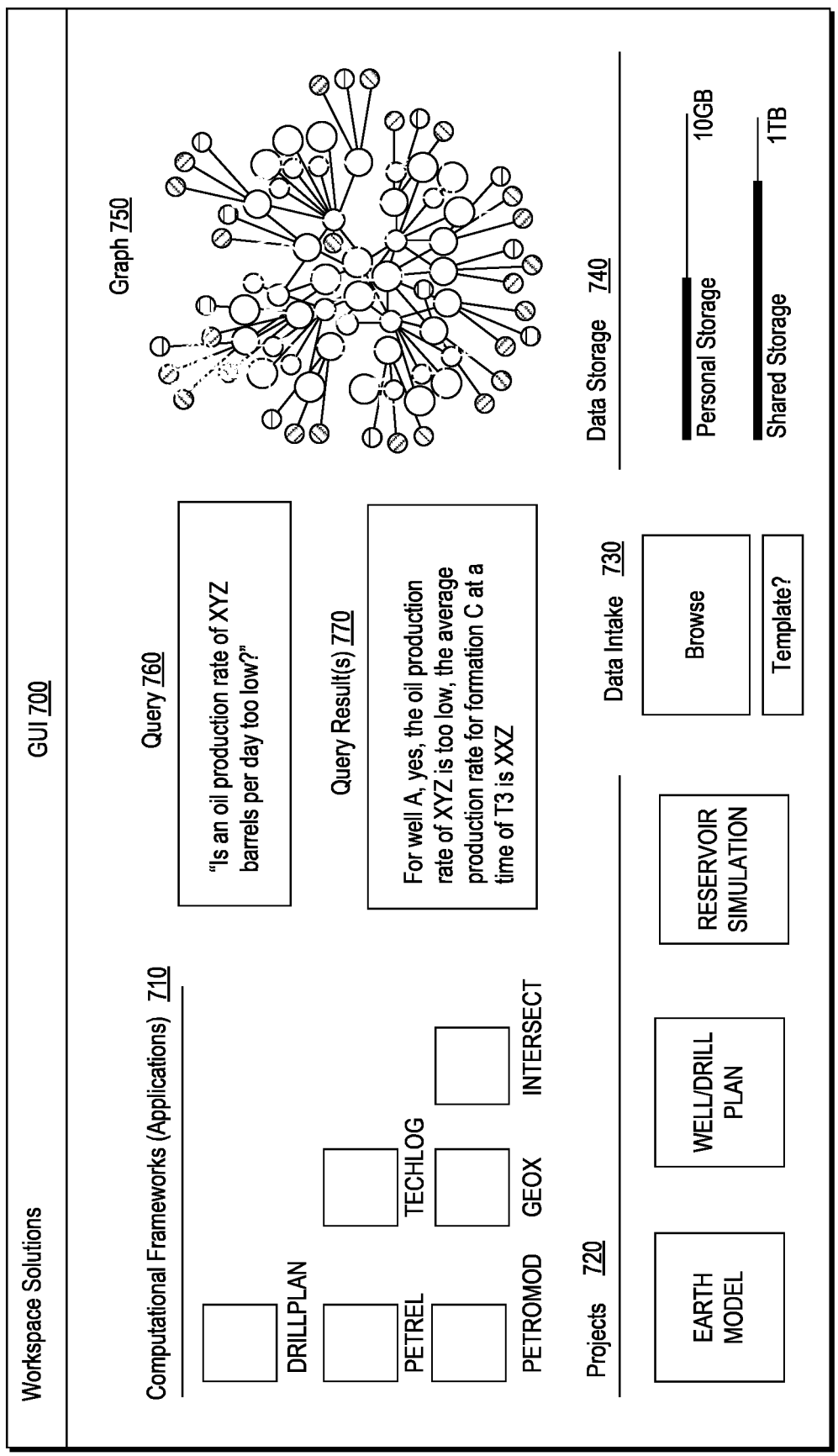
FIG. 7 illustrates an example of a graphical user interface.

FIG. 7 shows an example of a GUI 700 that includes various features that can be part of a workspace. For example, a computational framework area 710 includes icons that represent various types of computational frameworks such as a drilling plan framework, a seismic-to-simulation framework (e.g., PETREL framework, Schlumberger Limited, Houston, Texas), a measurements framework (e.g., TECHLOG framework, Schlumberger Limited, Houston, Texas), a mechanical earth modeling (MEM) framework (PETROMOD framework, Schlumberger Limited, Houston, Texas), an exploration risk, resource, and value assessment framework (e.g., GEOX, Schlumberger Limited, Houston, Texas), and a reservoir simulation framework (INTERSECT, Schlumberger Limited, Houston, Texas). As an example, one or more computational frameworks may be suitable for use in a system such as the system 300 of FIG. 3, the wellsite system 400 of FIG. 4, the system 500 of FIG. 5, etc.

In the example of FIG. 7, the GUI 700 can include a projects area 720 for various types of projects, a data intake area 730 for ingestion of data, a data storage area 740 for rendering graphics associated with data storage, a graph area 750 for rendering a graph, a query area 760 for entering and/or rendering a query, a query result(s) area 770 for rendering a query result or results.

As an example, a user of the GUI 700 may enter a query in the query area 760 that utilizes a graph rendered in the graph area 750 to generate one or more query results that can be rendered in the query result(s) area 770.

In the example of FIG. 7, a data file (e.g., as an icon, as a URL, etc.) can be loaded via the data intake area 730 such that data of the data file is ingested for utilization in one or more projects, which may utilize one or more of the computational frameworks. In the example of FIG. 7, the types of data or data files that can be ingested can be varied. As an example, the data intake area 730 and underlying control(s) can be a portal, which may be a secure portal, through which data are to "pass" before they can be utilized via one or more of the computational frameworks and/or projects.

In the example of FIG. 7, the data intake area 730 can be operatively coupled to one or more remote resources. For example, the GUI 700 may expose a remote drive or drives such as a cloud-based drive. As an example, a remote resource may be managed using a cloud platform. For example, consider a GOOGLE cloud platform, an AMAZON WEB SERVICES (AWS) cloud platform, a MICROSOFT AZURE cloud platform, etc.

As an example, a cloud platform may provide for object storage, block storage, file storage (e.g., a shared filesystem), managed SQL databases, NoSQL databases, etc. As to types of data, consider one or more of text, images, pictures, videos, audio, objects, blobs, structured data, unstructured data, low latency data, high-throughput data, time series data, semi-structured application data, hierarchical data, durable key-value data, etc. For example, particular data may be utilized in visual renderings and demand low latency such that glitches do not occur during buffering, rendering, interactive manipulations, etc. As an example, particular data may be generated as a binary large object (blob) for purposes of transmission, security, storage organization, etc. As an example, a sensor may generate time series data, which may be regular and/or irregular in time and which may or may not include a "global" time marker (e.g., time stamps, etc.). As an example, data may be in a wellsite information transfer standard markup language (WITSML) standard, which is a standard utilized in various operations including rig operations. As an example, data may be serially transferred ASCII data.

In the example of FIG. 7, one or more of the computational frameworks may be local and/or one or more of the computational frameworks may be remote. For example, the GUI 700 may be rendered locally using a display operatively coupled to a workstation (e.g., laptop, desktop, etc.) where the workstation includes executable instructions for instantiating a computational framework and/or the GUI 700 may be rendered locally using a display operatively coupled to or part of a computing device that includes one or more network interfaces that can operatively couple to one or more remote resources that can instantiate a computational framework. For example, consider a remote resource being a cloud-based resource. As an example, controls of the data intake area 730 may operate in cloud-based resources that are in a cloud platform that is common with data to be ingested and/or one or more computational frameworks to be utilized, which may consume ingested data. As an example, controls of the query related areas 750, 760 and 770 may operate in cloud-based resources that are in a cloud platform that is common with one or more computational frameworks to be utilized.

As explained, some features may be local and some features may be remote and various features may be within a common platform such as a cloud platform.

Figure 8:
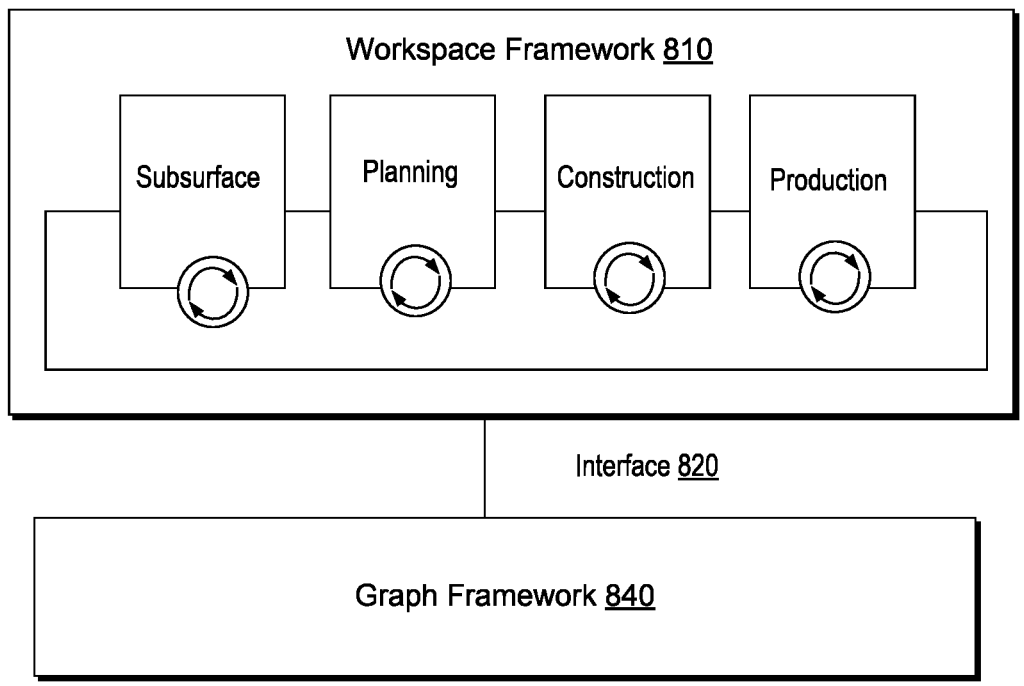
FIG. 8 illustrates an example of a system.

FIG. 8 shows an example of a system 800 that includes a workspace framework 810, an interface 820 and a graph framework 840. As shown, the graph framework 840 can be operatively coupled to the workspace framework 810 via the interface. As an example, a user may utilize the GUI 700 of FIG. 7 to cause the system 800 of FIG. 8 to generate and/or utilize a graph.

As an example, ingestion pipeline services can be utilized to dynamically orchestrate data curation through a configurable, extensible smart "pipeline" encompassing the breadth of data management stage gates (e.g., ingestion, enrichment, classification, data quality, indexing) and can be extensible beyond the stage gates, for example, to handle unforeseen datatypes and/or workflows.

As an example, an extensible pipeline service can be leveraged by documenting and persisting incoming data in a known, consistent, manner according to a schema, representing various aspects of the data. For example, consider aspects such as source of data, data semantics (what the data represent such as an object and/or an entity of an Earth model, of a computational framework, etc.), representative properties (e.g., of an object, entity, etc.), representative attributes (e.g., of an object, entity, etc.), data frame of reference, data relationship(s), etc.

As to source of data, consider the PROSOURCE E&P data management system (Schlumberger Limited, Houston, Texas), which provides management, visualization, and delivery capabilities for various types of data to streamline various workflows. Such a system can provide real-time capabilities to proactively manage wellbore operations using vendor-neutral data aggregation features. As an example, an aggregator system can be an operations equipment ready system that can be integrated into a system for a desired location with data connectivity (e.g., rig equipment installation, logging equipment installation, seismic equipment installation, laboratory equipment installation, etc.). As an example, a real-time data system can collect multiple data types, which may include customized data types according to customized data formats and/or one or more of the following data formats: WITS (serial, file, TCP, and http); WITSML (1.1, 1.2, 1.3.1.1 client and server); OPC-DA and OPC-UA (clients); DLIS; MAXWELL; and CSV.

As to a semantic understanding of what the data actually represents, consider data that represents a wellbore as an entity, which may be an object in an Earth model of a computational framework. As to a deterministic understanding of the various properties or attributes of the entity, these may vary from source to source. As to a deterministic understanding of the frame of reference of source data, such an understanding can help to facilitate frictionless (e.g., optionally lossless) consumption. For example, various types of data may be compressed or uncompressed; in 6-bit, 12-bit, 24-bit, 32-bit, 48-bit, 64-bit or other bit depth; in a color standard (e.g., RGB, HCL, LUV, etc.); in a time series, etc. As an example, an ingestion service may provide for one or more options and may automatically select an option as to how data are to be ingested, which may depend on one or more types of computational frameworks that can consume the particular data. For example, where a computational framework is limited to a particular bit-depth, the ingestion service may "downsize" the data (e.g., from 48-bit to 12-bit). As an example, where a computational framework is limited to a particular file type (e.g., JPEG, BMP, TIFF, etc.), the ingestion service may include one or more filters, converters, etc., that act to assure the data ingested is provided in a manner suitable for direct use by the computational framework. As to a deterministic understanding of how data relates to other data (e.g., in a common dataset or another dataset), such an approach may aim to heuristically determine (e.g., through relationship mining) one or more connection points of interest. For example, a rig identifier may be utilized to establish a connection point of interest between data. In such an example, it may be determined that the rig identifier corresponds to a wellsite with longitude and latitude and that the rig corresponding to the rig identifier was at that wellsite for a number of weeks. In such an example, particular data associated with the rig identifier can be segmented in time for a time associated with the wellsite. With the wellsite known for the particular data, it may be further associated with other data for that wellsite.

As an example, ingestion services can include GIS features, which can include GIS backend and frontend features. For example, an ingestion service can access an ArcGIS server and can include an ArcGIS server compatible client. In such an example, one or more ORACLE components may be included (e.g., a 64-bit ORACLE client such as the ORACLE client for an ArcGIS client. As to a backend, consider the ArcGIS server for the MICROSOFT .NET framework. As an example, resources local and/or remote can include multiple core processing equipment. As an example, services can include an ArcGIS Desktop Basic component.

As an example, an ingestion service can access GIS resources during ingestion to provide for rendering of GIS data in text, graphical and/or image form to allow a user to see a geographic location as may be associated with data being ingested. While a GIS type of system is mentioned, a lightweight mapping service may be utilized for an informative but a user experience that is of lesser richness. For example, with a GIS type of system, a user may be able to see a wellsite at one or more times, which can include a past time from a past satellite or other image and a latest time from a latest satellite or other image. As to imagery, it may be available in one or more forms (e.g., visible, IR, UV, microwave, etc.).

As an example, a system can include a dataset descriptor generator. For example, consider a PYTHON language based utility for generating metadata for a given input file such that the input file can be processed effectively (e.g., ingested, enriched, indexed, etc.).

The PYTHON language is a multi-paradigm programming language that supports object-oriented programming and structured programming. Features in the PYTHON language can support functional programming and aspect-oriented programming. The PYTHON language uses dynamic typing, and a combination of reference counting and a cycle-detecting garbage collector for memory management. It also features dynamic name resolution (late binding), which binds method and variable names during program execution. The PYTHON language includes filter( ), map( ), and reduce( ) functions; list comprehensions, dictionaries, and sets; and generator expressions. The PYTHON language library includes modules such as itertools and functools that can implement various functional tools.

As an example, a person may be represented as follows in the JSON format:

```
{
    "firstName": "John",
    "lastName": "Smith",
    "isAlive": true,
    "age": 27,
    "address": {
        "streetAddress": "21 2nd Street"
        "city": "New York",
        "state": "NY",
        "postalCode": "10021-3100"
    },
    "phoneNumbers": [
        {
            "type": "home",
            "number": "212 555-1234"
        }
    ]
}
```

As an example, a dataset descriptor can include generated metadata with details such as, for example, one or more of the following:
- List of column names and their data types;
- List of column names of type Latitude and Longitude to enable spatial indexing and discovery workflows;
- List of columns that will act as primary "key" columns while processing file to enable matching workflows (enrichment);
- List of columns frame of reference information (unit system, dimension, unit of measure, format, etc.);
- List of columns that participate in specialized entity representations, consider an example for a trajectory as follows: columns that will act as Depth, Azimuth and Inclination; and
- Data type mapping block enabling a user to specify how each type of column can be processed by one or more consuming services, such as indexing (for example, "int"→"double") for standardization.

As an example, a graph framework such as the graph framework 840 of FIG. 8 can utilize data as ingested and/or as otherwise accessible to generate a graph that includes vertices and edges where the edges represent relationships between vertices. As explained, data can include and/or be processed to include descriptors. As an example, a graph framework can utilize data and/or data descriptors to deterministically and/or probabilistically determine relationships of a graph.

FIG. 9 shows an example of a method 900 that includes an access block 910 for accessing data generated during field operations; a generation block 920 for generating a graph that includes vertices and edges using at least a portion of the data, where the edges represent relationships between vertices; and a generation block 930 for generating a query result using the graph responsive to receipt of a query.

The method 900 is shown as including various computer-readable storage medium (CRM) blocks 911, 921, and 931 that can include processor-executable instructions that can instruct a computing system, which can be a control system, to perform one or more of the actions described with respect to the method 900.

As shown in the example of FIG. 9, a system 990 can include one or more computers 992 that include one or more processors 993, memory 994 operatively coupled to at least one of the one or more processors 993, instructions 996 that can be, for example, stored in the memory 994, and one or more interfaces 995. As an example, the system 990 can include one or more processor-readable media that include processor-executable instructions executable by at least one of the one or more processors 993 to cause the system 990 to perform actions such as, for example, one or more actions of the method 900. As an example, the instructions 996 can include instructions of one or more of the CRM blocks 911, 921, and 931. The memory 994 can be or include the one or more processor-readable media where the processor-executable instructions can be or include instructions. As an example, a processor-readable medium can be a computer-readable storage medium that is non-transitory that is not a signal and that is not a carrier wave.

As an example, a system can include relationship mining features. For example, a dataset may be accessed that pertains to a particular wellsite, a particular field, a particular rig, a particular computational framework, etc., where such features perform relationship mining on the dataset. As an example, consider a scenario where a BHA component indicated in a dataset can be related to one or more other items in that dataset and/or in one or more other datasets. While a particular piece of equipment is mentioned in the foregoing example, other types of equipment may be of interest (e.g., seismic equipment, logging equipment, other drilling equipment, rig equipment, pipeline equipment, processing equipment, etc.).

As an example, a system can include one or more cloud-based resources (e.g., memory, computing cores, etc.), which can be utilized (e.g., provisioned, called-upon, etc.) to perform analyses over a broad array of data aggregated for the system where the system handles operations for a plurality of different computational frameworks.

As an example, a system can perform relationship mining and discovery between various types of data, which may include data in siloed data stores and/or locked within unstructured documents, and establishing links that enable advanced intelligence tools to discover previously unforeseen patterns between data, which may, to a person, appear innocuous or may not even appear.

As an example, a system can leveraging technologies and approaches such as, for example, one or more of explicit relationship declaration (e.g., during ingestion utilizing manifest files), implicit relationship detection (e.g., leveraging pre-defined rules and a system data catalog), and deep relationship mining (e.g., leveraging natural language processing (NLP), fact extraction, and other tools).

As an example, a system can be a multi-framework computational system that serves to enable an ecosystem for use of multiple frameworks. Such a system can include one or more ingestion services for ingestion of data, one or more unstructured document content indexing services, one or more fact extraction services, and/or one or more data catalog services.

As an example, a system can include a logic engine that includes and/or accesses logical rules that can be utilized to mine relationships. Such types of relationship can include implicit relationships and/or deeply detected and/or predicted relationships. Such relationships may be in addition to explicitly defined relationship; noting that a logic engine can include features that can identify, test and/or confirm a relationship that may be explicitly defined. As an example, a logic engine may operate in one or more modes, optionally with or without use of explicitly defined relationships. For example, consider an explicitly defined relationship that may be stated in a manner that is specific to a particular dataset and/or framework (e.g., a statement as to a relationship). Where a logic engine does not consume that type of statement, parse certain metadata as to the defined relationship, etc., the logic engine may operate in a mode that can nevertheless establish the relationship. In such a manner, a system may optionally operate, to a desired degree, agnostically to explicitly defined relationships. Such an approach may operate to confirm or otherwise verify that a relationship that is explicitly defined in one or more statements, etc., actually exists. As a logic engine may operate in part in a "direction", foregoing a starting point that uses explicitly defined relationships may, at times, help to mine implicit relationships, detect deep relationships and/or predict relationships. As mentioned, an option may exist to utilize or to not utilize explicitly defined relationships. Where both approaches are performed, a method may include comparing results and optionally augmenting results and/or re-running mining features to generate a robust set of relationships.

As an example, a system may operate according to one or more types of relationship models. For example, consider a relationship model that includes vertices and edges. In such an example, logical rules can be implemented to determine entities to a relationship as vertices and nature(s) and/or direction(s) of a relationship as one or more edges. As an example, a system can enable intelligence via relationship discovery, for example, through previously unknown or unforeseen pathways (edges) between distributed entities (vertices).

As an example, consider the following convention of logical implication (where → implies a relationship):

a→b
b→c
c→ . . .
. . . →n
Therefore, a→ . . .

In the foregoing notation, where "→" is unknown, a dataset may not include indicia of the implied unknown relationship (e.g., not explicitly defined, etc.). As an example, a system may operate to make such a relationship "known", for example, in the context of domain specific entities, measurements and people.

As an example, relationship mining can include operating according to one or more aspects of discovery such as, for example: explicit (structured/pre-defined) relationships; implicit (rule-based) relationships; and deep relationship detection and prediction.

As an example, a relationship model can be an output of a system. As an example, such a model may be rendered to a display as a visualization, optionally with vertices and edges. As an example, such a visualization may be animated during a workflow, which may be a workflow that includes establishing at least a portion of the model and/or a workflow that includes utilizing at least a portion of the model. For example, consider a workflow that includes utilizing the model to answer a query such as: "What is the volume of producible oil from a well in relationship to resources expended in producing the volume of producible oil from the well?" In such an example, one or more queries may be issued that traverse the model to determine resources demanded for drilling and operating a well and to determine amounts of oil, water and gas. In such an example, historical, present day and/or future values may be utilized as to resources and amounts to determine a value proposition upon which a decision may be made whether to drill and operate the well. In such an example, a system can access one or more databases such as a pricing database that includes prices associated with fluids produced, separation of produced fluids, etc. As an example, consider accessing one or more databases that may be specific to an entity such as an oilfield services entity where a database may include proprietary cost data. As an example, an oilfield services entity may utilize a system to provide output where the output is then processed using data from a database. As an example, an entity may utilize a system to provide output that can be distributed to one or more other entities, for example, to provide estimates, bids, etc., as to costs to perform one or more aspects of drilling, operating, etc.

As another example of utilizing a model, consider a query that asks: "Identify wells that cross the formation YZZ where the porosity is less than 0.2 and that have well logs". In such an example, a graph model can be utilized to provide an answer that lists such wells. As an example, as the graph model generates results, the results may be visualized on a rendering of the graph model, which may become graphical controls that can be actuated to cause rendering of one or more of the well logs. As an example, a system can organize results from a query, which may optionally be a natural language query, and render the results to a display. For example, consider rendering a well logs to a display for purposes of viewing and comparing to understand how the formation YZZ can be drilled into to form a borehole to that formation, how the borehole can be completed as a well, etc.

As yet another example, consider a scenario where a producing well is producing oil with a certain fraction of water, which can demand resources for separation of the water from the oil. In such an example, as the fraction of water increases (e.g., due to flooding, etc.), the demand for resources may make the current paradigm unfavorable. However, one or more treatments (e.g., chemical, physical and/or other stimulation treatments) may be available to alter the producing well. For example, consider estimated production being X and actual production being X/2, a query may be run using a system where a model is traversed to determine if a treatment can beneficially impact production. Such an approach may utilize data available from an offset well or offset wells where such a treatment has been implemented with a corresponding physical impact on production.

The foregoing examples leverage relationships, which can be relationships that are beyond those that may be specified explicitly by a user or, for example, specified explicitly within a dataset.

As an example, a system may be implemented automatically responsive to one or more factors. For example, consider automatically triggering a query in response to production from a well falling below an estimated production value for the well at a particular point in time. In such an example, a query may be formulated for the well, which may utilize the "age" of the well (e.g., production time), to determine if one or more types of operations can address the drop in production. For example, consider a query that may specify: "For a well that is 0.75 of estimated production after 3 years, can one or more of chemical treatment (e.g., acid wash), new perforations, new completion (e.g., packer, etc.), gas lift and electric submersible pump (ESP) artificial lift effectively benefit production for the next year?" Results of such a query can provide results organized for the different types of technologies where a decision may be made to implement one or more of the types of technologies.

As mentioned, a system can be utilized for one or more purposes. While datasets and/or databases are mentioned, input can include documents. For example, images, scans, etc., can be input to a system. For example, consider a user that is provided with a given set of documents for which a bid is to be prepared, which can include a collection of publicly available data and private/corporate data. As an example, a system can provide answers as to how the user can glean an understanding of how these data are connected to expeditiously make an accurate decision with accurate information. The amounts and/or types of data can be beyond the physical mental capacity and capabilities of the user, particularly given a dynamic decision making environment. As an example, a system can process various data and output a graph model that can allow for visualization, optionally animated, that helps a user understand relationships and answers based thereon. Without a good understanding of how data correlates both on existing or known edges and also unforeseen or unknown edges, the user can render her own intelligent answers, decisions, instructions, etc.

As an example, model such as a graph model can be a multi-framework model. For example, consider a graph model that includes features associated with a 3D earth model building framework and a drilling framework. In such an example, features can be related via earth properties and drilling equipment and/or drilling operations. Consider a drillstring that can include a measurement component that is particularly suited for making measurements in a formation modeled via the 3D earth model building framework where the drillstring, with that component, is still capable of drilling a desired borehole with a specific dogleg severity (DLS). The relationship between the component and the planned well may not be apparent absent use of a logic engine, which may apply rules and/or operations for deep detection and/or prediction.

As an example, a system may provide for a large number of relationships, which can be utilized in expanding utility of a natural language process (NLP) approach to queries. For example, where relationships are limited to those that may be pre-defined and generic to wells, a corresponding corpus for NLP and expressions thereof may be limited. In contrast, where relationships are many, a corpus for NPL and expressions thereof can be expanded.

As an example, a system can include mining relationships and building a corpus (e.g., or augmenting a corpus) for making queries, where context may be also built. As an example, consider a scenario where 30 relationships exist in a relational database for a dataset of a framework and where 15 relationships exist in a relational database for another dataset of another framework. In such a scenario, a corpus can contextual expressions thereof can be limited. In contrast, consider a scenario where a system can mine relationships from the two datasets such that 100 or more relationships may be identified where a corpus can be built and contextualized in a richer and deeper manner than the former scenario. In the latter scenario, the number and type of queries can be more numerous (e.g., in terminology and context). As an example, terminology and/or contextual information may be represented in a graph model or in association with a graph model. As an example, a graph model can include a hierarchy. As an example, a graph model can include duplicities.

As to a graph model, consider two people, Sally and John, who are friends, where both John and Sally have read the book YYZ. In such an example, vertices (e.g., nodes) can be defined as John, Sally and Book YYZ. Note that although John and Sally are people and book YYZ is a book, there are three vertices as each instance of an entity can be represented as a separate vertex. As to labels, John and Sally can be labeled as "people" and the book YYZ can be labeled as a "book". Further, the graph model can include relationships where a relationship connects two vertices and provides for finding one or more related vertices of data. A relationship can be defined to have a source vertex and a target vertex that can be indicated as source and target by a direction (e.g., an arrow). As an example, a relationship can be stored to a data structure with a particular direction; noting that traversal can be uni-directional (e.g., along a specified direction) or bi-directional (e.g., in either direction), which can, for example, provide for querying a relationship without specifying direction. As to the foregoing example, four relationships can be: John is friends with Sally; Sally is friends with John; John has read Book YYZ; and Sally has read Book YYZ. Thus, a graph model can include John and Sally as vertices (labeled "people") and can be connected to each other by an "is friends with" type of relationship; and John and Sally have both read the book YYZ such that each of their vertices (each labeled "people") can be connected to the Book YYZ vertex with a "has read" type of relationship. In the foregoing example, terminology can include, for example, people, people names, books, book names, friend, friends, "friends with", and "read". A natural language query may ask one of: (a) "What people have read the book YYZ?" or (b) "Has a friend of John read the book YYZ?". Such queries can provide answers: (a) "John and Sally have read the book YYZ" or (b) "Yes, Sally, a friend of John's, has read the book YYZ". As an example, one or more properties may be stored in association with one or more relationships. For example, consider a date for which John and Sally became friends ("is friends with relationship") or, for example, consider a rating given to the John to Book YYZ "has read" relationship and another rating given to the Sally to Book YYZ "has read" relationship.

As an example, an answer can utilize terms of a query and optionally one or more additional terms to assure that an answer is placed in a proper context. Such an approach can help to assure that answers are read in a proper context.

As an example, for a system for multiple frameworks associated with oilfield operations, safety and costs can be concerns where miscommunication can result in unsafe conditions and/or unexpected costs. As an example, a graph model approach can help to reduce miscommunication where answers are output in a context. As an example, a system can include a context option that can provide for output in context or, for example, simple output. As to simple output, consider the John/Sally example where simple output may be (a) "John, Sally"; or (b) "Yes". As an example, where a query is no longer rendered or where a query may have been submitted where a considerable amount of time passes before an answer is returned, an "in context" format to an answer can be beneficial to refresh a user's mind as to the query. As to a considerable amount of time, a multi-framework system may involve consideration of multiple dataset for multiple wells where a dataset may be of the order of a gigabyte or more. In such an example, time to generate output (e.g., an answer) may be of the order of minutes or more.

As an example, a system can generate a graph model that abides by a rule such as no broken links. Such a rule may be implemented to help ensure that an existing relationship will not point to a non-existing endpoint. As an example, a relationship can be defined as having a start vertex and an end vertex. As an example, a graph model may be user editable. For example, consider a graphical user interface (GUI) that includes features for deleting a vertex, which can call for deleting its associated relationship or relationships. In such an example, consider a graph mode that includes labels for wells such as Well A, Well B and Well C. If a user understands that Well C is not a proper analog of a well under consideration (e.g., Well A, Well B or another well), the user may delete or otherwise cause Well C to be effectively deleted. As another example, consider Well C being shut-in and no longer producing. In such an example, one or more production vertices that have a relationship with Well C (e.g., prior production data for Well C) may be of less relevance to a query and hence deleted from the graph model. In such an example, aspects (e.g., vertices) that are relevant to a query may be retained while some that are less or not relevant may be deleted, which may provide for answers in a more expeditious manner and/or more accurate answers (e.g., in context, etc.).

As an example, a query can be in a context that utilized negation. For example, "and not in a vertical well". A system may interpret such language to negate "vertical well" vertices, which may expedite traversal of a graph model that includes labels, for example, as to "well type" where a "well type" may be selected as being vertical, deviated, etc. As an example, depending on settings, a system may optionally execute a query in a manner that effectively deletes certain links (e.g., relationships) and/or vertices from a graph model and/or traversal thereof.

As an example, a user (e.g., a hybrid data scientist/data manager) can target a specific field, and opt to analyze relationships of data, for example, data that may pivot on rig or drilling contractor. As an example, a system, fueled by the relationships discovered through aspect pillars (e.g., explicit, implicit, and deep relationships) can provide a context of a rig and/or rigging contractor. Such a system can include mining features such that relationships can be discovered. For example, consider one or more of the following examples: as stuck pipe is 40 percent more likely when the rig is X when crossing formation Y; or broken drill bits is 85 percent more likely when the drilling contractor is A but 70 percent less likely when the drilling contractor is B.

As an example, a system can include features that can be exposed across multiple users, which may be from different entities. For example, consider a system that can detect trends in queries as to one or more types of data and that can issue notifications, optionally automatically, that can help to increase such data. As an example, consider a system that enables data commoditization and/or marketplace business, e.g. "third party data in this area of interest is available for purchase from IHS and WellDB", or "There is a lot of active interest in this area. Would you like to offer a dataset for sale to third parties?"

As an example, a system can include components that are operable to provide insights across structured and/or unstructured data, for example, between explicit, implicit, and deep relationships. As an example, a system can include components operable to establish, maintain, etc., one or more relational databases, one or more graph databases, document content indexing and/or fact extraction.

As mentioned, explicit (e.g., structured/pre-defined) relationships may exist and be detectable or otherwise uncoverable. An example of an explicit (structured/pre-defined) relationship can be one that is available through ingesting documents or sub-entities into a system and linking them directly with wellbores previously ingested into the system.

As an example, an ingestion process can ingest well data and associated artifacts like well tops, well logs, and documents into a system. Such an approach may occur in a batch, periodic, semi-continuous and/or continuous manner, optionally in real-time during field operations. As an example, an ingestion service may be implemented with an approach where one or more relationships can be defined, for example, in a manifest file. As an example, consider the following data structure as being utilized to specify a relationship in a manifest file:

| Name | Desc. | Created | Modified | Type | Size | Title | Author | Wellbore: API |
|---|---|---|---|---|---|---|---|---|
| CSW-101.pips | PIPESIM Model | 20XX-02-12 | 20XX-02-27 | App/pips | 590 kb | PIPESIM Model for Well CSW-101 | SK | 500192 |

In the foregoing example, the data structure can include: file-fileName (see "Name"), which includes the filename of the related file (e.g., document, log, top, model, etc.) that is to be related to a target vertex; attribute-documentTitle (see "Title"), which includes pertinent metadata about the source vertex to enable discovery; and relationship-ingestion-test: wellbore:api (see "Wellbore:API"), which includes an explicitly defined relationship along with a target entity (wellbore) and target attribute to search/match against (API).

In the foregoing example, the file with name CSW-101.pips (e.g., a PIPESIM model of a surface network simulation framework) can be stored in a storage device (e.g., a remote device such as a cloud-based resource) and the corresponding file metadata that includes the attributes can be stored in a storage device of a system (e.g., local and/or remote). At the time of ingestion process, records of type "wellbore" can be searched where the attribute "API" equals "500192". In such an example, if a record is found in the system, then the record metadata for CSW-101.pips will include a relationships data block with reference to "wellbore" record having the "API" attribute including the value of the manifest file.

Below is an example of code in the PYTHON language:

```
"data": {
"fileName": "CSW-101.pips",
"fileDescription": "PIPESIM Model",
"dateCreated": "20XX-02-12T17:57:00Z",
"dateModified": "20XX.02-27T12:07:00Z",
"mimeType": "application/pips",
"fileSize": "590 kb",
"documentTitle": "PM" (e.g., "PIPESIM Model for Well CSW-101"),
"documentauthor": "SK",
```

```
"ingestion-test:wellbore:api": "500192",
"bucketURI": "gs://. . . /. . . /CSW-101.pips",
"relationships": [
{
"wellbore": ["slb: ingestion-test :wellbore-XXTTTA"], "confidence score": 100
}
],
"jobId": "1231505971-20XX-09-19-16.43-22-927"
},
"id": "slb:ingestion-test:wellbore-CSW-101.pips-20XX-09-19-16-43-39",
"version": 1537375421235857,
"kind": "slb:ingestion-test:wellbore:1.0.0",
"acl": {"viewers": ["data.ingestion.test@slb.cloud.slbX.com"],
"owners": ["data.ingestion.test@slb. cloud.slbX.com"]
},
"legal": {"legaltags": ["slb-CountryIndex"],
"otherRelevantDataCountries": ["BE", "US" ],
"status": "compliant"
}
```

In the foregoing example, as to the confidence score (see, e.g., value of "100"), if search results for the entity to which this artifact is to be connected is 1, then the confidence score is 100 percent. A confidence score can be reduced with number of search results. For example, if there are two results available in the system with a common "id", then the confidence score can be determined to be 50 percent. Such an approach allows users to understand that sometimes, relationships that are identified may be duplicates and/or of low value. As mentioned, a system may include a feature that can utilize explicit relationships or not. As an example, a system may include a feature that can analyze explicit relationships, which can include, for example, determining a confidence score that is based on a number of instances of an explicit relationship.

As to implicit (e.g., rule-based) relationships, a system can include relationship mining as a level that infers relationships, for example, based on values of data. Such an approach may utilize a known/given set of relationship rules or inference points. As an example, a system may operate according to a hierarchy where different types of levels can exist in the hierarchy. For example, where explicit relationships are utilized, a level that corresponds to explicit relationships can be different than a level that corresponds to implicit relationships. As an example, a system may operate in a sequential manner according to a hierarchy. For example, consider executing operations to determine explicit relationships prior to executing operations to determine implicit relationships. As mentioned, a hierarchy can include selectable operations where, for example, a user may select one or more levels of a hierarchy.

As to an example of implicit relationship discovery by a system, consider how digital well logs may be related to a corresponding wellbore, which may be a wellbore already ingested by the system. In such an example, consider a digital well file that is stored in a LAS 2.0 format (e.g., "LAS file") as associated with a computational framework. In such an example, the system can parse the LAS file and attempt to relate it to an existing wellbore in the system, for example, given the following rule order and match rules. In such an example, where a given rule condition is met, the system can specify the relationship and confidence score (e.g., and optionally exits the implicit workflow).

Example Rule Priority Order: (i) Link to WKE Wellbore; (ii) Link to Raw (unprocessed) Wellbore; (iii) Link to Raw Wellbore from the -W (wellbore) information block in the LAS file.

As to a rule match order, in the foregoing example, rule match attributes can be based on attribute names matching the LAS 2.0 format standard mapped against "Well Known Attributes" specified in a data catalog service of a system. As an example, consider one or more of the following: Match based on UWI (Unique Well Identified); Match based on API (American Petroleum Institute Number); and Match based on WELL (mapped to "Well Name" as the WKA, mapped to source "Well Name" as per source/attribute).

FIG. 10 shows an example of a graphical user interface (GUI) 1000 that includes data according to a data catalog service as mapping "WKA" for "Wellbore" entity to various "Raw" sources; noting that some sources include more or less attributes. In the example GUI 1000, consider "Well Name" (see also, e.g., "WellName", "Well_Name", etc.).

Figure 11:
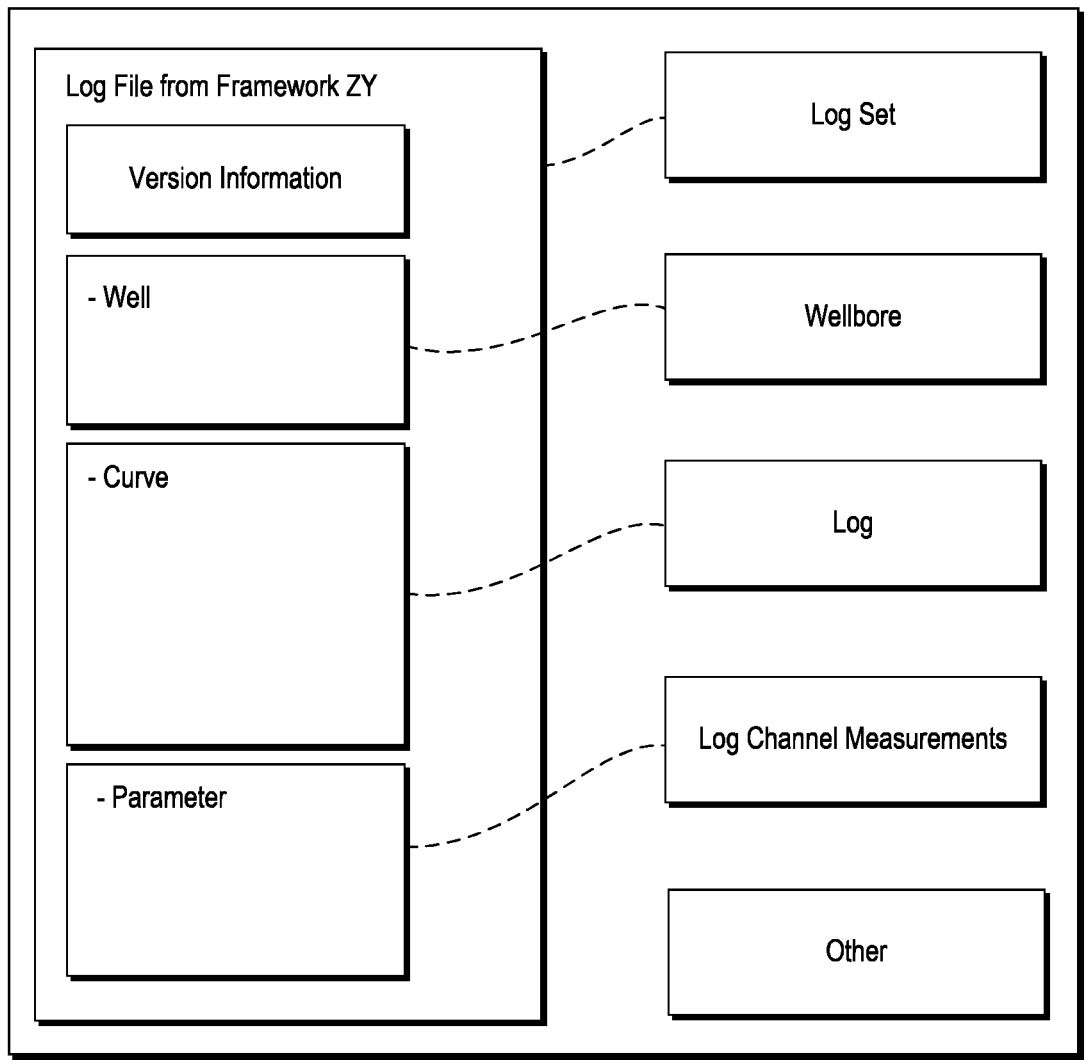
FIG. 11 illustrates an example of a graphical user interface.

FIG. 11 shows an example of a graphical user interface (GUI) 1100 that includes various panels, including a file panel and linking component panels. The GUI 1100 may be utilized as part of an ingestion and linking workflow. As to the file panel (left side), it can render data from the ingested file, which, as mentioned, can be in a format that is associated with a particular computational framework (e.g., PIPESIM, PETREL, etc.). As an example, data may be organized with a well heading, a curve heading and a parameter heading. In such an example, the file can be parsed or organized with well data, log (e.g., curve) data, and measurement values (e.g., parameter values).

As to the linking component panels, these may include a log set panel, a wellbore panel, a log panel, a log channel measurement panel and/or one or more other panels. The various linking panels may be particular to one or more types of files and, hence, for example, be particular to one or more types of computational frameworks.

As an example, a log set panel can provide for handling of raw, unprocessed log channels as may be grouped by a file that can be ingested. In such an example, each channel can include an ID (e.g., LogStore ID) and link to a well (e.g., WKE or Raw).

As an example, a wellbore panel can provide for handing of linking such as linking a "Log Set" to a well per "Well WKE" by using indicators such as UWI, API and/or "Well Name".

As to a log panel, it can provide for handling of channels such that each channel can be ingested into a data lake of a system For example, consider intesting each channel as an individual raw log record. Such an approach may follow one or more types of schema, for example, consider a Well-Known Scheme for ingestion based on a Log WKE Well-Known Schema. In such an example, each "Log" can include a LogStore ID and a link to a wellbore (e.g., WKE or Raw).

As to a log channel measurements panel, such a panel can provide for handling individual log channels. For example, individual log channels (Log Channel) can be ingested into a log store (LogStore) with a corresponding ID (LogStore ID) written back to the Log Set and corresponding Log.

As an example, a confidence score can be associated with each implicitly derived relationship to allow a user a better understanding of the nature of a derived relationship.

Figure 12:
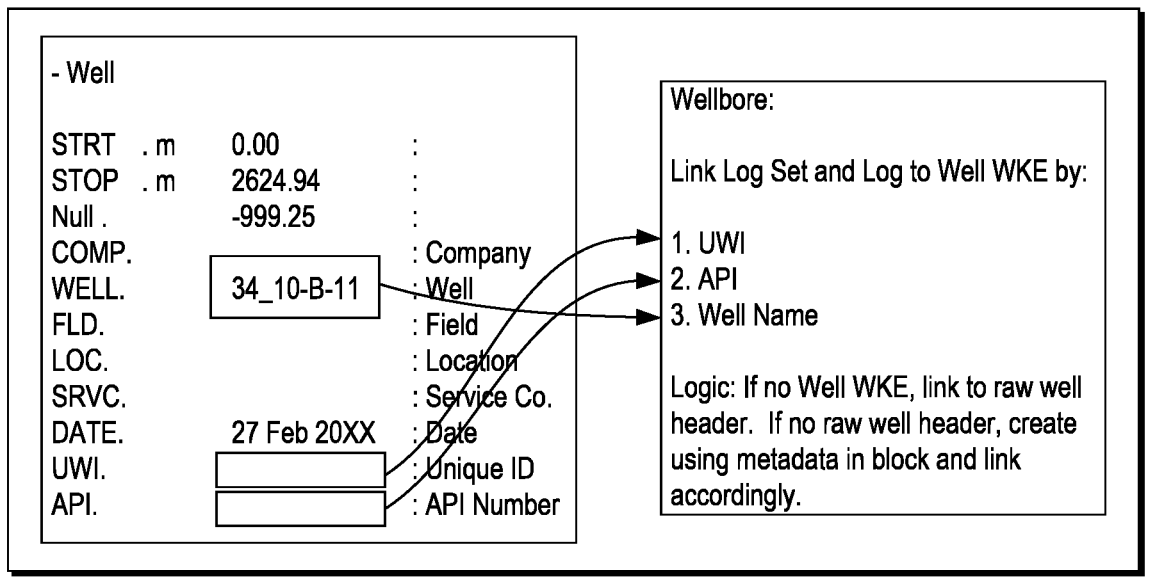
FIG. 12 illustrates an example of a graphical user interface.

FIG. 12 shows an example of a graphical user interface (GUI) 1200 as in FIG. 11 where various relationships are indicated. Specifically, a well name is shown as existing within a portion of the ingested file.

As an example, a file can include data that pertains to measurements such as, for example, data as in Table 1 below.

TABLE 1

| DEPT. m | Depth |
|---|---|
| BS. in | BS |
| CALI. in | Calibration |
| DRHO. g/cm3 | Density |
| DT. us/ft | DT |
| GR. gAPI | GR |
| IDPH. ohm · m | IDPH |
| IMPH. ohm · m | IMPH |
| NPHI. m3/m3 | NPHI |
| RHOB. g/cm3 | RHOB |
| ILD. ohm · m | ILD |
| ILM. ohm · m | ILM |
| SW. | SW |
| KLOG. mD | KLOG |

As an example, the data in Table 1 may be in a file along with data such as the data of the GUI 1200 of FIG. 12. For example, the data in Table 1 can be in a "curve" portion of a file. As mentioned, a parameter portion of a file can include measurements (e.g., measurement values) that can correspond to data such as the data in Table 1.

In FIG. 11, the panel "-measurements" can include log channel measurements as may be specified according to the data in Table 1. For example, measurements can be measurement values from sensors, which may be raw, processed, etc., by one or more tools (e.g., surface and/or downhole).

As explained, an explicit relationship can be deterministic and an implicit relationship may be deterministic. As to deep mining of relationships, which can include detection and/or prediction, it can be probabilistic. A probabilistic relationship can be derived from probability, which may account for randomness in occurrence of one or more entities, events, etc. As an example, a deterministic relationship may be from a deterministic model that suggests there are known reasons and/or causes of relationships.

Figure 13:
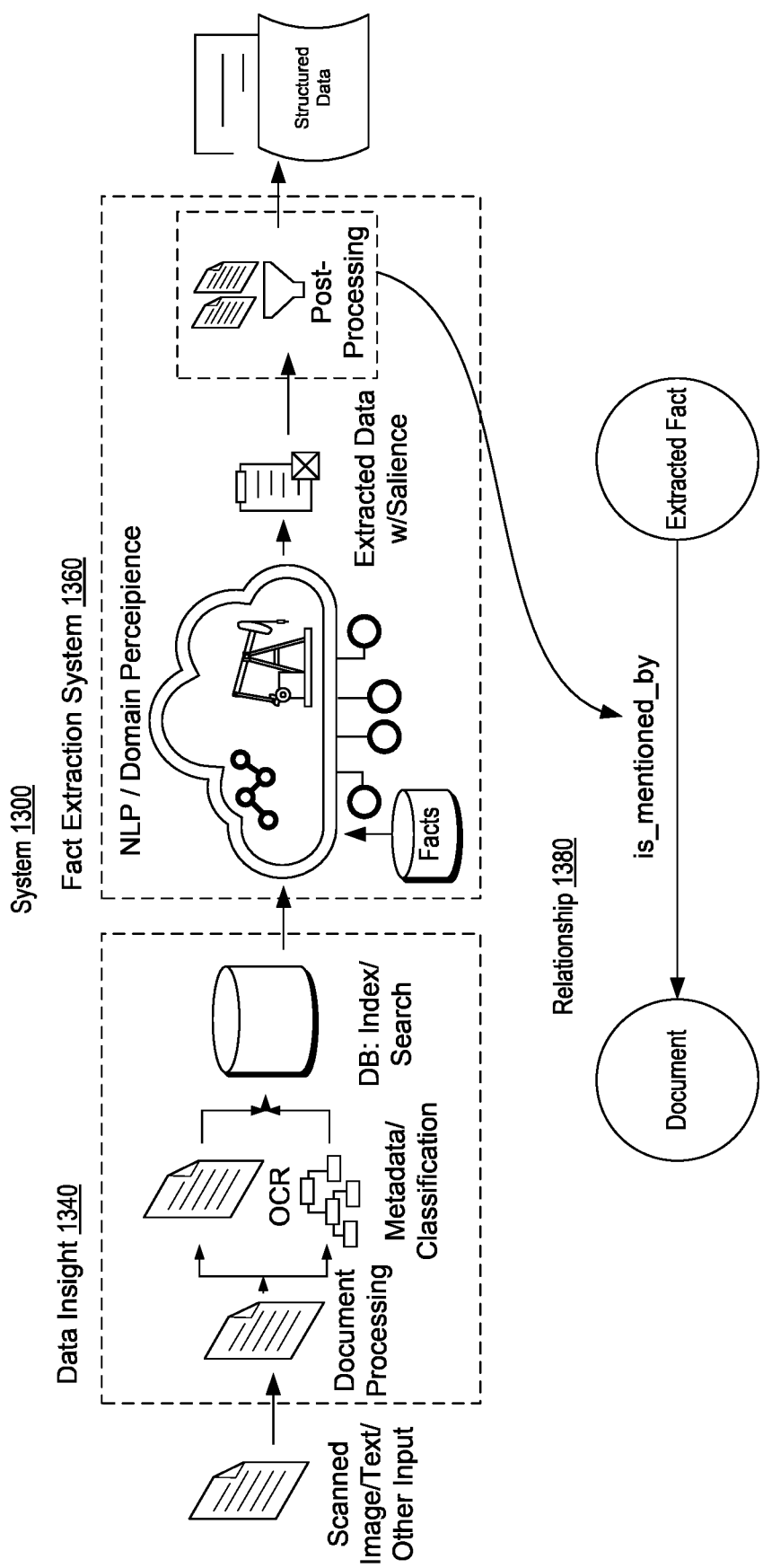
FIG. 13 illustrates an example of a system.

FIG. 13 shows an example of a system 1300 that includes a data insight system 1340 and a fact extraction system 1360. As shown, the system 1300 can detect and/or predict and output a relationship 1380, which is shown in the context of a document and an extracted fact.

The system 1300 can perform relationship mining that is probabilistic, and based on a combination of heuristics, fact extraction, natural language processing, and advanced relationship management enabled by technologies such as, for example, the GRAPHDB framework (Ontotext USA, Inc., Jersey City, New Jersey).

The GRAPHDB framework includes a semantic graph database, compliant with W3C standards. As an example, a semantic graph database (e.g., a RDF triplestore, etc.) can provide a core infrastructure for solutions where modelling agility, data integration, relationship exploration and cross-enterprise data publishing and consumption are desired.

A framework can provide one or more of various types of support. For example, consider SPARQL (a recursive acronym for SPARQL protocol and RDF query language), which is an RDF query language (e.g., a semantic query language for databases that is able to retrieve and handle data stored in the resource description framework (RDF) format).

Figure 14:
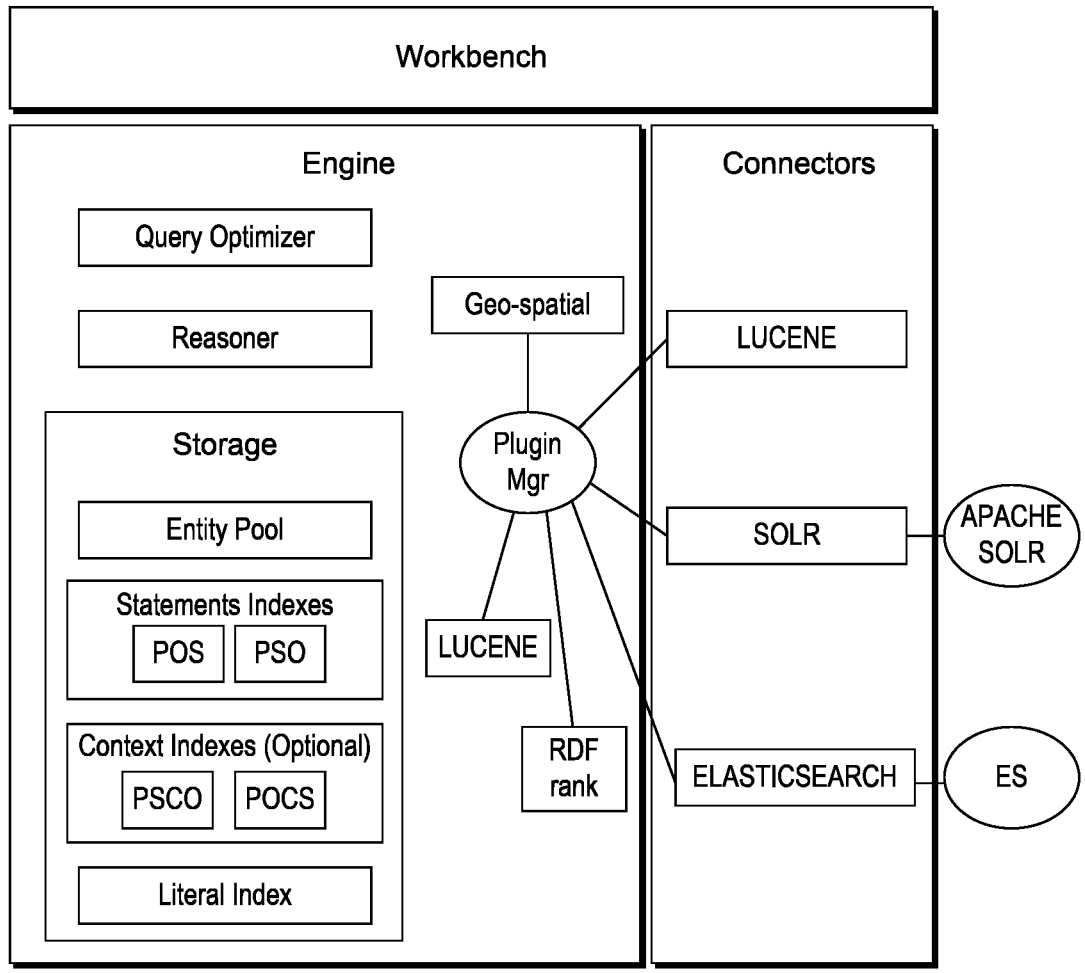
FIG. 14 illustrates an example of a framework.

FIG. 14 shows an example of a framework 1400, which can include one or more features of the GRAPHDB framework. As shown, the framework can include a workbench component, an engine and connectors. The engine can include a query optimizer, a reasonser, storage and a plugin manager. The storage can include an entity pool, statements indexes, a literal index and optional context indexes. The plugin manager may provide for access to various plugins, optionally via one or more of the connectors. For example, consider a geo-spatial plugin, a LUCENE plugin, a RDF Rank plugin, etc. As to connectors, consider a LUCENE connector, a SOLR connector for APACHESOLR, and an elasticsearch (ES) connector for ELASTICSEARCH.

Various Apache Software Foundation (Forest Hill, Maryland) components may be utilized via a framework. For example, consider a LUCENE core, which provides JAVA-based indexing and search technology, as well as spellchecking, hit highlighting and advanced analysis/tokenization capabilities. As another example, consider SOLR, which is a high performance search server built using the LUCENE core, with XML/HTTP and JSON/PYTHON/RUBY APIs, hit highlighting, faceted search, caching, replication, and a web administration interface. As another example, consider PYLUCENE, which is a PYTHON language capabilities port of a core project.

ELASTICSEARCH ("ES") (Elastic B.V., Mountain View, California) is a search engine based on the LUCENE library. ES provides a distributed, multitenant-capable full-text search engine with an HTTP web interface and schema-free JSON documents. ES is developed in Java. In a server-client architecture, clients are available in JAVA, .NET (C#), PHP, PYTHON, APACHE GROOVY, RUBY and other languages.

RDF Rank is an algorithm that can identify more relevant and/or more popular entities in a repository by examining their interconnectedness. The popularity of entities can then be used to order query results (e.g., ranking results).

The RDF Rank component computes a numerical weighting for nodes (e.g., vertices) in an entire RDF graph stored in a repository, including URIs, blank nodes and literals. The weights can be floating point numbers with values between 0 and 1 that can be interpreted as a measure of a node's relevance/popularity.

In the framework 1400, the query optimizer can be configured to attempt to determine an efficient way to execute a given query by considering one or more possible query plans. As an example, once queries are submitted and parsed, they can then be passed to the query optimizer where optimization occurs. As an example, hints can be utilized for guiding a query optimizer.

As to a reasoner, the framework 1400 can include a TRREE engine for triple reasoning and rule entailment. Such an engine can perform reasoning based on forward-chaining of entailment rules over RDF triple patterns with variables. TRREE's reasoning strategy can involve total materialization; noting that various optimizations can be used.

As to storage, the framework 1400 may store its data in files in a configured storage directory, which can include indices on statements predicate-object-subject (POS) and predicate-subject-object (PSO), context index CPSO, literal index and page cache, where indices on statements for use in inference and query evaluation can include, for example, a predicate-object-subject (POS) index and/or a predicate-subject-object (PSO) index.

As to an entity pool, the framework 1400 can include such a pool and features to convert entities (e.g., URIs, blank nodes and literals) to internal IDs (e.g., 32-, 40-bit integers, etc.). As an example, an entity pool may support transactional behavior, which can improve space usage and cluster behavior.

As to connectors, the framework 1400 can include one or more connectors that provide rapid keyword and faceted (e.g., aggregation) searches that can be implemented by an external component or service, which may have an ability of staying automatically up-to-date with GRAPHDB repository data.

Referring again to the system 1300, it shows a probabilistic relationship discovered through fact extraction from unstructured documents and relating the relationship to structured data that exists in a multi-framework system such as the system 800 of FIG. 8.

FIG. 15 shows an example of a graphical user interface (GUI) 1500 in a table form where probabilistic relationships can be discovered through natural language processing of structured data that exists in a multi-framework system such as the system 800 of FIG. 8.

Figure 16:
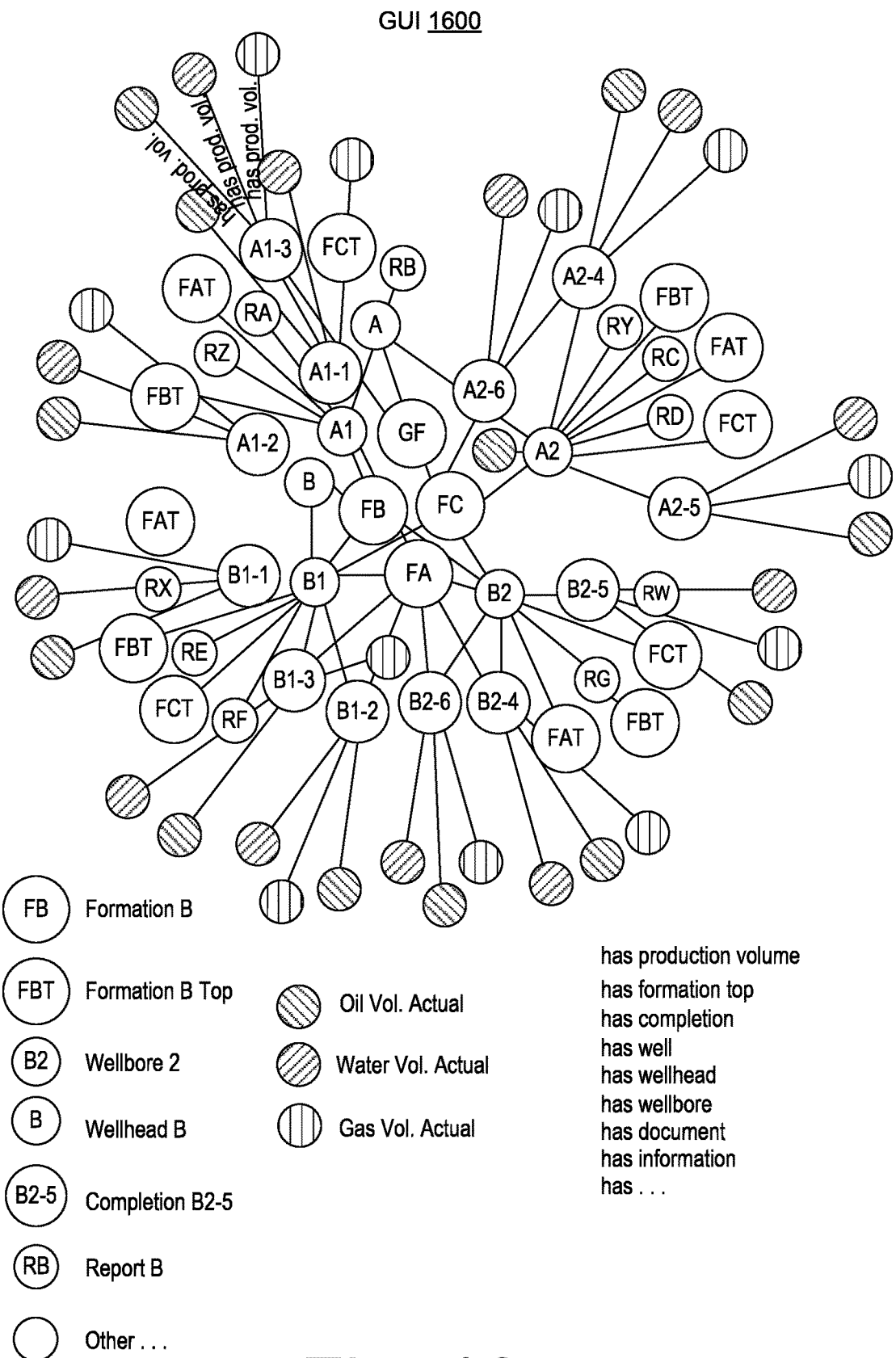
FIG. 16 illustrates an example of a graphical user interface.

FIG. 16 shows an example of a graphical user interface (GUI) 1600 in a graphical form. The graphical form includes various types of relationships as may be determined using one or more of explicit, implicity and deep technologies. Such a graphic form can be extremely complex as to its relationship, which can be both deterministically and probabilistically generated.

As an example, a method may include autogeneration of a structure such as a graph structure. For example, where data include a number of entities of one type that exceeds a number of entities of another, different type, a method can include autogeneration of a graph structure where the more numerous entities are positioned at a different level (e.g., radially outwardly, etc.). As shown in FIG. 16, oil, water and gas volumes are more numerous than wellheads such that a graphical representation may place fluid volume entities in a direction that is outward from a center or outward from a wellhead. As an example, relationships such as "has" relationships may be automatically established (e.g., "has production volume", "has oil volume", "has water volume", "has gas volume", etc.).

Figure 17:
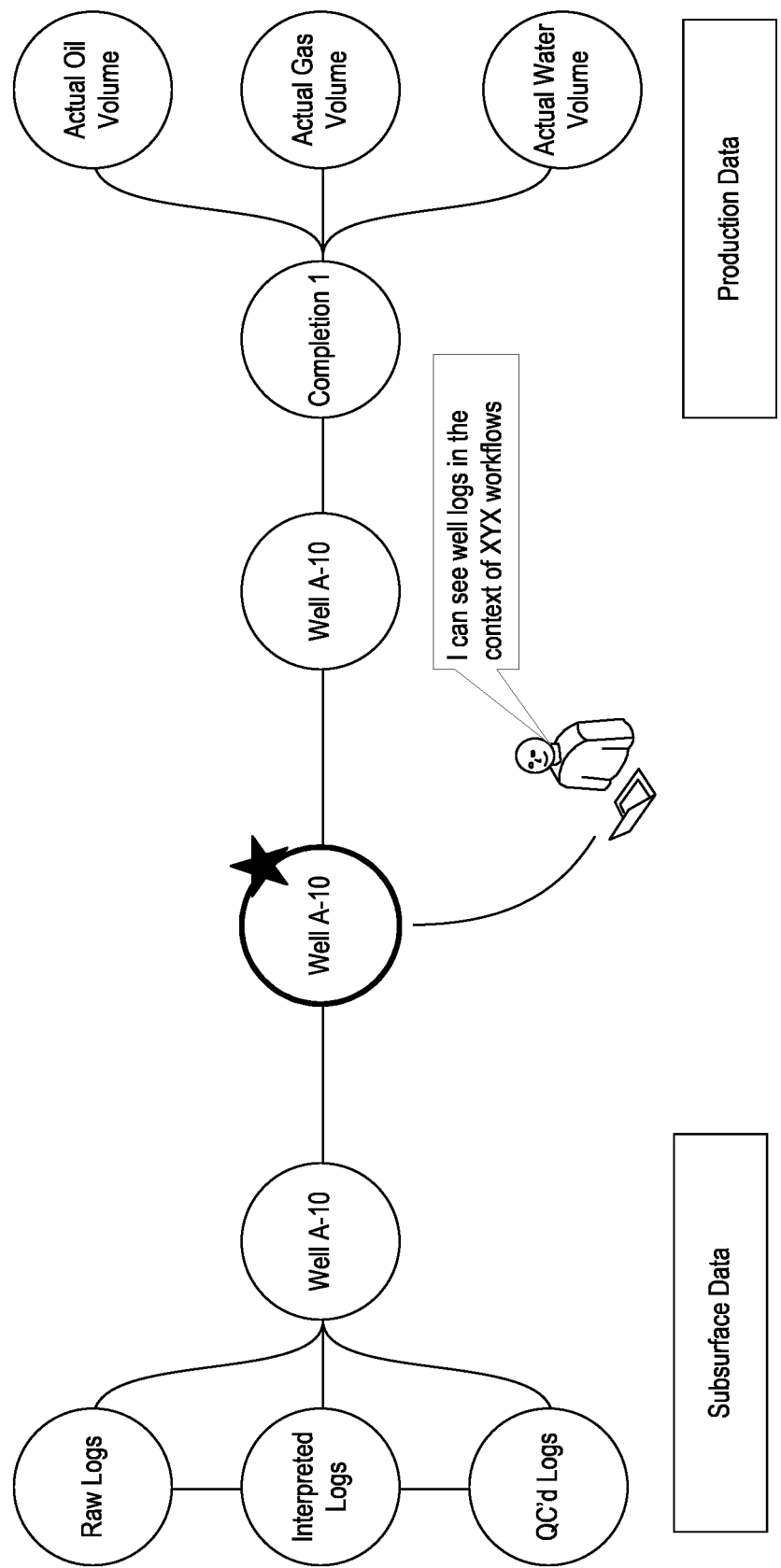
FIG. 17 illustrates an example of a graphical user interface.

FIG. 17 shows an example of a graphical user interface (GUI) 1700 in a graphical form of a technical problem with a technical solution. As shown, a user can readily find well logs in the context of one or more workflows. In the example of FIG. 17, various types of subsurface data can be understood in relationship to various types of production data. For example, consider a well "A10" being in a graph or graph database such that various types of relationships can be determined and assigned where the well A10 can be represented as a vertex (e.g., a node) with various relationships (e.g., edges). In such an example, deterministic and/or probabilistic techniques can be utilized to establish the relationships. As an example, a corpus of terminology and contextual information may be generated by a relationship mining process such that the formulation of various queries may be guided by such a corpus. As an example, a query can be submitted via a graphical user interface (e.g., a search field or search fields) and/or can be submitted automatically (e.g., by a piece of equipment). As to the latter, consider a piece of equipment that includes or is operatively coupled to a sensor or sensors. In such an example, sensor data may indicate that a limit may be reached (e.g., an alarm limit, etc.) such that a notification and/or a control action is to be taken. A trigger can cause issuance of a query, optionally including one or more measurement values, equipment type, etc., where a query results may be communicated to a computing device for rendering to a display or other action.

As an example, a trigger, query and query results can be in a "machine" understandable language. For example, consider a controller that is operatively coupled to one or more sensors and one or more actuators where the controller operates according to a programming language executable in an operating system environment established by a processor of the controller. The controller may issue a code as a query where a search engine can translate the code into a natural language query. For example, consider a database (e.g., a table, etc.) that can associate the code with a natural language query. In such an example, the codes and/or queries may be programmed in advance, for example, by a user of equipment during and/or prior to operations. For example, as to data that include data from a downhole tool for a particular wireline job in a borehole, a user may have some questions in mind prior to performing the job where those questions can be related to codes. As an example, consider "does an offset well have lithology Y at a true vertical depth between X meters and Z meters?" Such a query may be issued responsive to a measurement acquired by the downhole tool that is germane to the query (e.g., a depth, a lithology measure, etc.). Results from a natural language query may be translated back into a code for communication to and consumption by the controller to take one or more control actions. In the foregoing example, consider a result that pertains to an offset well that gives the downhole tool a code to start acquiring data at a greater resolution, with greater frequency, to slow down movement of the downhole tool (e.g., via surface equipment), etc. For example, consider a result being translated into a code YZY that instructs circuitry of the downhole tool to increase frequency of measurements (e.g., rather than once per minute, taking measurements twice per minute, etc.). As an example, where a code has been translated into a natural language query, that query may be rendered to a display of an operator such that the operator can readily determine what the controller is doing (e.g., a controller of a downhole tool and/or another piece of equipment or pieces of equipment, etc.). Similarly, query results in natural language form may be rendered to a display such that an operator can readily determine what a controller is being instructed to do. In such an example, a computing device accessible by the operator may provide for a confirmation of the query result/control action prior to implementation thereof by the controller.

Consider an example as to pump rate of drilling fluid for drilling a wellbore X, where a controller issues a query as a code such as 1047, which, in natural language, asks "Is a pump rate of 2000 gallons per minute too high?". In response, a framework can generate a natural language answer of "At the measured depth of 1500 feet in wellbore X, the maximum is to be 1800 gallons per minute, so, yes, the pump rate is too high". In translation to a code, consider a code 2475, which instructs the controller to reduce the pump rate to a maximum of 1800 gallons per minute for the next 500 feet of drilling in wellbore X. The answer can be based on one or more other wellbores, which can be "related" to the wellbore X, along with their pump rates for particular depths (e.g., in a particular formation) with particular equipment. In such an example, as an option, an operator station can see the transaction of the controller via a graphical user interface that can include a graphical control that is actuatable to allow the query result to be translated into a code for communication to and consumption by the controller. Upon actuation, the translation can occur and the controller can effectuate the control action. Such an example may be implemented in a system such as the system 470 of FIG. 4 (see, e.g., the mud tanks 430, the pump buildings 440, etc.). Such an example can include one or more operations associates with the system 800 of FIG. 8. For example, a construction framework may provide for acquiring and processing drilling data, which includes drilling fluid data and measured depth data, along with equipment data, etc. A framework such as the framework 1400 can generate a graph with relationships using such data, optionally along with formation types of data as may be from an exploration framework (see, e.g., wireline logging operations systems of FIG. 5). As mentioned, well logs can be considered in forming a graph, which can include detailed property data as recorded with respect to depth for one or more formations. As an example, relationships can be established between formation properties, measured depth, true vertical depth, drilling, etc., which can be utilized by people and/or machines to control one or more types of field operations. As an example, a system may operate in real-time where queries and query results are generated by the system where such queries may be entered via a graphical user interface, a natural language interface, a machine interface, etc.

As an example, an interface can include a speech-to-text interface and/or a text-to-speech interface. In such an example, a user may have a cellphone that can be used to call and/or text a query interface in a natural language manner. For example, consider a driller at a wellsite calling a query interface and being prompted to speak a query. In such an example, the driller can speak a query in a particular format, which may commence with a wellsite ID, for example, "I am at wellsite 3757, is a production volume of oil of XYZ barrels per day too low?". In response, the driller's cellphone may receive a speech answer and/or a text answer. In such an example, a text message answer may be stored to a database, along with the driller's query in the form of a text message (e.g., where speech-to-text conversion is applied).

Figure 18:
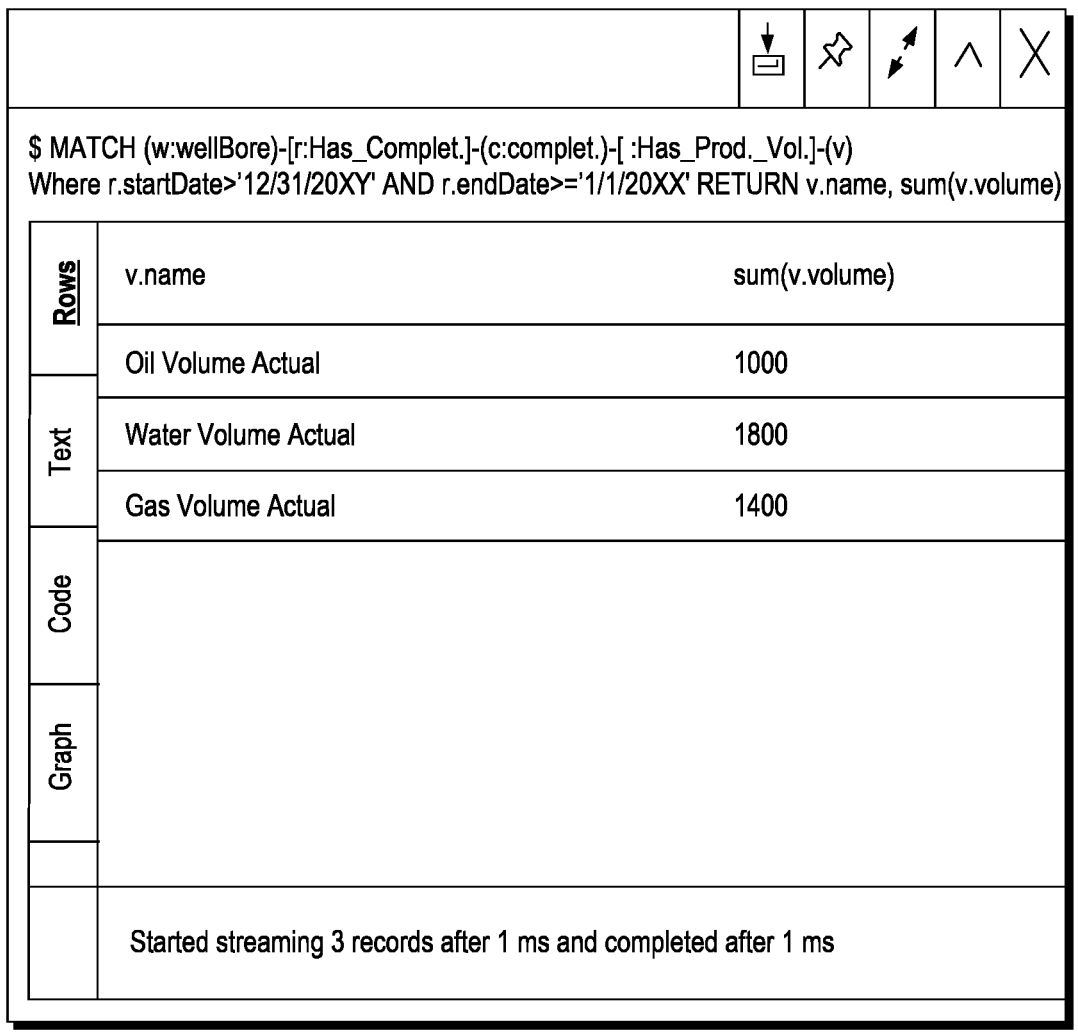
FIG. 18 illustrates an example of a graphical user interface.

FIG. 18 shows an example of a GUI 1800 that can be part of a process that involves searching to uncover relationships, data, etc. For example, consider a natural language search such as "show me actual aggregate oil, gas, and water production volumes for completions that were active in 20XX". In such an example, output may be generated and rendered via a GUI such as the GUI 1800. In the example of FIG. 18, a field includes the following: "$ MATCH (w:wellBore)-[r:Has_Complet.]-(c:complet.)-[:Has_Prod._Vol.]-(v) where r.startDate>'12/31/20XY' AND rendDate>='1/1/20XX' RETURN v.name, sum(v.volume)". Such information may be generated in response to a natural language query. As shown, an oil volume actual field includes a sum of 1000, a water volume actual field includes a sum of 1800 and a gas volume actual field includes a sum of 1400. The information rendered is responsive to the query and quantitative. For example, computations may be performed on data accessed responsive to the query to provide for the sums shown in the GUI 1800 of FIG. 18. In FIG. 18, the results of the query are shown in row form, noting that one or more other forms may be utilized for presentation of results (e.g., and/or intermediate results such as individual amounts of oil, water and gas from individual wells, regions, etc.).

FIG. 19 shows an example of a GUI 1900 that pertains to a natural language query: "Show me daily drilling reports for wellbores that cross the Bakken formation where porosity is <0.2". The example output is rendered in a graphical form. For example, responsive to receipt of the natural language query a framework can logically uncover documents that are daily drilling reports with information germane to the query. In such an example, the one or more graphics can be graphical controls that can be actuated to, for example, access details of a report, render one or more additional vertices, exposed and/or render one or more edges, etc.

With reference to the GUI 700 of FIG. 7, one or more features of the GUIs 1700 and 1800 may be utilized. For example, consider one or more of the graph area 750, the query field 760, and the query result(s) field 770 as corresponding to one or more of the graph area of the GUI 1800, the formulated query (e.g., "match" statement) of the GUIs 1700 and 1800, and the row area of the GUI 1700 (e.g., table format, etc.), respectively.

Before the claims, an example computer program listing appears, which is more than 60 lines and less than 300 lines. The example listing includes examples of some schemas that may be utilized for one or more relationships. As an example, a method can include utilizing a natural key (e.g., name, etc.) approach to relationships. As an example, a method can include calculating confidence scores as part of a relationship process.

In the example computer program listing an example is also given, which pertains to relationships as to wellbores that includes confidence information.

In the example computer program listing, the attribute "names" may be an optional attribute for a relationship producer to indicate a natural key by which a relationship can be identified. For example, name may be identified by "featured attribute" for a particular entity. As to confidence score, a heuristic relationship context may be used for calculation thereof. For example, consider confidence score being equal to 1/X % where X is the number of relationships discovered.

As an example, a GUI such as the GUI 700 may be utilized to make queries that return results where results can include those that may be expected for a relational database search (e.g., using SQL) and can include those that are beyond what a relational database search can provide. For example, rather than using a structured query language (SQL), the GUI 700 can provide for natural language types of queries such as one or more of the examples illustrated in the GUI 1800 of FIG. 18 and the GUI 1900 of FIG. 19.

As an example, a natural language query may pertain to production operations and query data for production volumes subject to dates, ranges of dates, production composition, etc. As an example, a natural language query may pertain to one or more drilling operations such as stuck pipe, drilling operators, etc. As an example, a result from a query can be in one or more forms, which may be text, tabular, graphical, animated, etc. As an example, consider a graphical user interface that includes one or more sliders that can alter a date, a composition, a region, etc., in real-time where results are generated and rendered. Such an approach can allow for a natural language query and identification of information in the natural language query that may be quantified in one or more manners. For example, where a query includes a date range, a GUI may be rendered with a date slider such that adjustment of the date using the date slider causes display or highlighting of results that pertain to a date or range of dates. As another example, consider a production query with amount of gas in produced fluid, which may be quantified as a percentage or a fraction. In such an example, a GUI may be rendered based on the natural language query being parsed for quantifiable information that includes the gas percentage or gas fraction. A GUI may be rendered that includes a slider control for gas percentage or gas fraction where a user may adjust the slider of the slider control to cause the GUI to display or highlight particular results. As an example, where a natural language query includes multiple quantifiable aspects, a multi-slider approach may be utilized. As mentioned, an animated approach may be implemented, for example, to animate with respect to time for a series of dates, whether rendering results forward in time and/or backward in time (e.g., temporal navigation, etc.).

As an example, a query may be made that operates in an ongoing or periodic manner. For example, consider a query as to stuck pipe where incoming drilling data are analyzed and added to results where the analyzed drilling data indicate that a stuck pipe condition has occurred. As an example, a query may have no results and be set to run on future data. For example, consider a query including a phrase as to an oil fraction in produced fluid where existing production data do not indicate that such an oil fraction has been achieved (e.g., whether low or high or between two values). In such an example, the query may be ongoing and generate a result once such an oil fraction has been achieved per available production data.

As an example, a query may generate results using explicit relationships and/or implicit relationships. For example, an explicit relationship may be between a wellbore and a formation characteristic where an implicit relationship may be via an extended approach that includes relationships such as the aforementioned "has" types of relationships in a vertices and edges framework (e.g., a graph approach, a graph like approach, etc.). As mentioned, "has" types of relationships may be with respect to vertices and can include, for example, for production data "has production volume", "has oil volume", "has water volume", "has gas volume", etc. As to drilling operations data, "has" may be for one or more of the following examples: "has stuck pipe", "has BHA XYZ", "has drilling fluid YYZ", "has perforations", "has cement", etc. As to types of production equipment, consider one or more of the following examples: "has artificial lift", "has electric submersible pump", "has gas lift", "has steam assisted gravity drainage", etc. As to logging, consider one or more of the following examples: "has GR", "has images", "has resistivity", "has temperature", "has pressure", "has used tool YY", "has NMR", etc.

As an example, a method can include accessing data generated during field operations; generating a graph that includes vertices and edges using at least a portion of the data, where the edges represent relationships between vertices; and generating a query result using the graph responsive to receipt of a query. In such an example, the field operations can include drilling operations and logging operations. As an example, vertices can include well-related vertices and, for example, relationships can include one or more of well equipment-based relationships, well production-based relationships, formation-based relationships, and well log-based relationships.

As an example, a method can include generating a corpus based at least in part on labels of vertices and natural language of relationships. In such an example, a method can include guiding formulation of a query using the corpus.

As an example, a method can include rendering a graph to a display. In such an example, the graph may be animated, include a slider control, include slider controls, etc. As an example, a graph may be adjustable with respect to time, which may be via an animation, a slider control, a play control, a reverse play control, etc.

As an example, a method can include receiving the query from a controller operatively coupled to field equipment. In such an example, the method can include translating the query from the controller to a natural language form and/or translating the query result from a natural language form to a code and transmitting the code to the controller. In such an example, a method can include receiving a signal responsive to actuation of a graphic control of a graphical user interface where the signal triggers transmitting the code to the controller.

As an example, relationships can include probabilistic relationships, for example, where the relationships include deterministic relationships.

As an example, relationships can include explicitly defined relationships, implicitly defined relationships and probabilistically defined relationships.

As an example, relationships can include probabilistically defined relationships between sensor data and well identification data.

As an example, a system can include a processor; memory accessible to the processor; processor-executable instructions stored in the memory and executable by the processor to instruct the system to: access data generated during field operations; generate a graph that includes vertices and edges using at least a portion of the data, where the edges represent relationships between vertices; and generate a query result using the graph responsive to receipt of a query.

As an example, one or more computer-readable storage media can include computer-executable instructions executable to instruct a computing system to: access data generated during field operations; generate a graph that includes vertices and edges using at least a portion of the data, where the edges represent relationships between vertices; and generate a query result using the graph responsive to receipt of a query.

Figure 20:
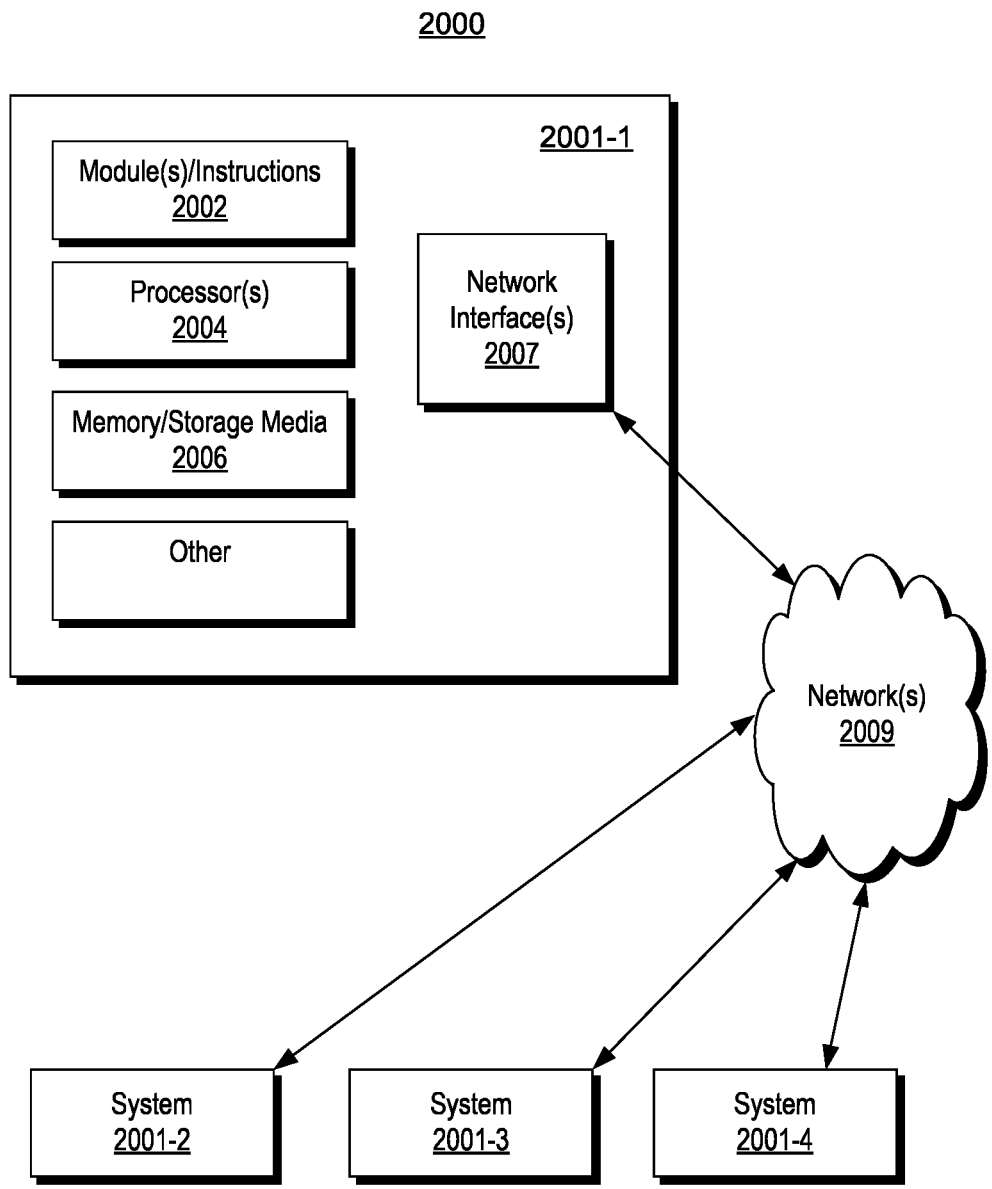
FIG. 20 illustrates examples of computing and networking equipment.

In some embodiments, a method or methods may be executed by a computing system. FIG. 20 shows an example of a system 2000 that can include one or more computing systems 2001-1, 2001-2, 2001-3 and 2001-4, which may be operatively coupled via one or more networks 2009, which may include wired and/or wireless networks.

As an example, a system can include an individual computer system or an arrangement of distributed computer systems. In the example of FIG. 20, the computer system 2001-1 can include one or more modules 2002, which may be or include processor-executable instructions, for example, executable to perform various tasks (e.g., receiving information, requesting information, processing information, simulation, outputting information, etc.).

As an example, a module may be executed independently, or in coordination with, one or more processors 2004, which is (or are) operatively coupled to one or more storage media 2006 (e.g., via wire, wirelessly, etc.). As an example, one or more of the one or more processors 2004 can be operatively coupled to at least one of one or more network interface 2007. In such an example, the computer system 2001-1 can transmit and/or receive information, for example, via the one or more networks 2009 (e.g., consider one or more of the Internet, a private network, a cellular network, a satellite network, etc.).

As an example, the computer system 2001-1 may receive from and/or transmit information to one or more other devices, which may be or include, for example, one or more of the computer systems 2001-2, etc. A device may be located in a physical location that differs from that of the computer system 2001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 21:
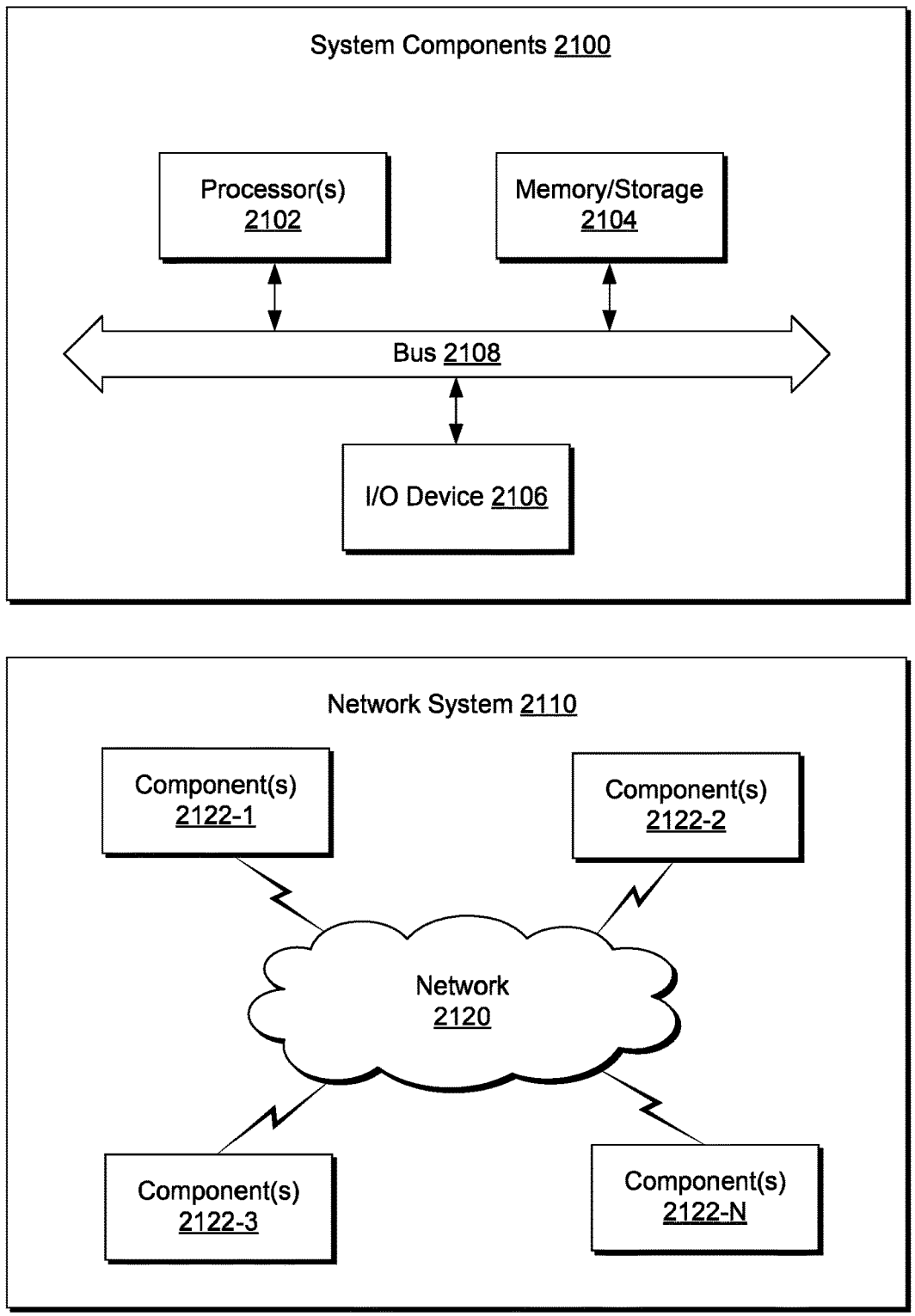
FIG. 21 illustrates example components of a system and a networked system.

FIG. 21 shows components of a computing system 2100 and a networked system 2110. The system 2100 includes one or more processors 2102, memory and/or storage components 2104, one or more input and/or output devices 2106 and a bus 2108. According to an embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). According to an embodiment, a computer-readable medium may be a storage component such as a physical memory storage device, for example, a chip, a chip on a package, a memory card, etc.

According to an embodiment, components may be distributed, such as in the network system 2110. The network system 2110 includes components 2122-1, 2122-2, 2122-3, . . . 2122-N. For example, the components 2122-1 may include the processor(s) 2102 while the component(s) 2122-3 may include memory accessible by the processor(s) 2102. Further, the component(s) 2122-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

Example Computer Program Listing

Below, an example of a computer program listing is presented with various examples of parameters, attributes, instructions, etc., where the number of lines is more than 60 lines and less than 300 lines.

```
"toOneRelationship":{
"$id":"definitions/toOneRelationship",
"description":"Arelationshipfromthisentitytoone
otherentityeitherbynaturalkey(name)orid,
optionallyclassifiedbyconfidencelevel",
"properties":{
"id":{
"description":"Theidoftherelatedobject",
"example":"slb:petrel:seismic_survey_845934c40e8d922
bc57b678990d55722",
"format":"link",
"title":"RelatedObjectId",
"type":"string"
},
"name":{
"description":"Thenameornaturalkeyoftherelatedobject",
"example":"SurveyST2016",
"title":"RelatedObjectName",
"type":"string"
},
"confidence":{
"description":"Theconfidenceoftherelationship",
"example":1.0,
"title":"RelationshipConfidence",
"type":"number"
}
},
"title":"ToOneReiationship",
"type":"object"
},
{
"toManyRelationship":{
"$id":"definitions/toManyRelationship",
"description":"Arelationshipfromthisentityto
manyotherentitieseitherbynaturalkey(name)orexplicitid,
optionallyclassifiedbyconfidencelevel.",
"properties":{
"ids":{
"description":"Theidsoftherelatedobjects.
Itispopulatedforanexplicitrelationshipwherethetargetentity
ispresentasarecordinthedataecosystem.
Keepallthearraysorderedandaligned.",
"format":"link",
"title":"RelatedObjectId",
"items":{
"type":"string"
},
"type":"array"
},
"names":{
"description":"Thenamesornaturalkeysoftherelatedobjects.
Keepallthearraysorderedandaligned.",
"title":"RelatedObjectNames",
"items":{
"type":"string"
},
"type":"array"
},
"confidences":{
"description":"Theconfidencesoftherelationships.
Keepallthearraysorderedandaligned.",
"title":"RelationshipConfidences",
"items":{
"type":"number"
},
"type":"array"
}
}
}
}
```

Example

```
"data":{
  "relationships":{
    "wellbores":{
      "ids":[
        "slb:prosource:wellbore-0f1a5219-4640-50af-9f63-
c09140d57c4d",
        "slb:prosource:wellbore-5c57b3cc-69a6-5f30-afcb-
7f0d12e60c77"
      ],
      "names":[
        "58-1",
        "17-2"
      ]
      "confidences":[50,50]
    }
  }
}
```

What is claimed is:

1. A method comprising:

accessing data generated during field operations using a computational framework, wherein the data comprise structured data within database structures and unstructured data within digitally stored documents, and wherein the data comprise entity data for entities and field data from measurements;

applying deterministic rules to the data using the computational framework, wherein meeting a condition of one of the deterministic rules establishes a deterministic relationship for a portion of the data and associates a confidence score to the deterministic relationship;

discovering probabilistic relationships for the data using the computational framework, wherein the probabilistic relationships comprise descriptions generated through natural language processing of the structured data that describe relationships within the structured data and comprise descriptions generated through fact extraction from the unstructured data that describe relationships between extracted facts and portions of the structured data;

generating a data structure representable as a graph that comprises vertices and edges using at least the portion of the data, wherein each of the vertices represents one of the entities or one of the measurements, wherein the edges represent the relationships between the vertices, wherein one or more of the vertices positioned at a center of the graph are representative of one or more geological formations, and wherein the edges disposed radially from the center of the graph and connecting corresponding vertices are representative of different geological formations, wellheads, wellbores, well completions, formation tops, reports, and fluid volumes at different hierarchy levels; and generating a query result using the data structure responsive to receipt of a query, wherein the query result depends at least in part on one or more of the descriptions that describe the relationships between the vertices.

2. The method of claim 1 wherein the field operations comprise drilling operations and logging operations.

3. The method of claim 1 wherein the vertices comprise well-related vertices.

4. The method of claim 3 wherein the relationships comprise well equipment-based relationships.

5. The method of claim 3 wherein the relationships comprise well production-based relationships.

6. The method of claim 3 wherein the relationships comprise formation-based relationships.

7. The method of claim 3 wherein the relationships comprise well log-based relationships.

8. The method of claim 1 comprising generating a corpus based at least in part on labels of the vertices and natural language of the relationships.

9. The method of claim 8 comprising guiding formulation of a query using the corpus.

10. The method of claim 1 comprising rendering the graph to a display.

11. The method of claim 1 comprising receiving the query from a controller operatively coupled to field equipment.

12. The method of claim 11 comprising translating the query from the controller to a natural language form.

13. The method of claim 11 comprising translating the query result from a natural language form to a code and transmitting the code to the controller.

14. The method of claim 13 comprising receiving a signal responsive to actuation of a graphic control of a graphical user interface wherein the signal triggers transmitting the code to the controller.

15. The method of claim 1 wherein the probabilistic relationships comprise probabilistically defined relationships between sensor data the field data and the entity data, wherein the field data comprise sensor data and wherein the entity data comprise well identification data.

16. A system comprising:
a processor;
memory accessible to the processor;
processor-executable instructions stored in the memory and executable by the processor to instruct the system to:
  access data generated during field operations, wherein the data comprise structured data within database structures and unstructured data within digitally stored documents, and wherein the data comprise entity data for entities and field data from measurements;
  apply deterministic rules to the data, wherein meeting a condition of one of the deterministic rules establishes a deterministic relationship for a portion of the data and associates a confidence score to the deterministic relationship;
  discover probabilistic relationships for the data using the system, wherein the probabilistic relationships comprise descriptions generated through natural language processing of the structured data that describe relationships within the structured data and comprise descriptions generated through fact extraction from the unstructured data that describe relationships between extracted facts and portions of the structured data;
  generate a data structure representable as a graph that comprises vertices and edges using at least a portion of the data, wherein each of the vertices represents one of the entities or one of the measurements, wherein the edges represent the relationships between the vertices, wherein one or more of the vertices positioned at a center of the graph are representative of one or more geological formations, and wherein the edges disposed radially from the center of the graph and connecting corresponding vertices are representative of different geological formations, wellheads, wellbores, well completions, formation tops, reports, and fluid volumes at different hierarchy levels; and
  generate a query result using the data structure responsive to receipt of a query, wherein the query result depends at least in part on one or more of the descriptions that describe the relationships between the vertices.

17. One or more computer-readable storage media comprising computer-executable instructions executable to instruct a computing system to:
access data generated during field operations, wherein the data comprise structured data within database structures and unstructured data within digitally stored documents, and wherein the data comprise entity data for entities and field data from measurements;
apply deterministic rules to the data, wherein meeting a condition of one of the deterministic rules establishes a deterministic relationship for a portion of the data and associates a confidence score to the deterministic relationship;
discover probabilistic relationships for the data using the computing system, wherein the probabilistic relationships comprise descriptions generated through natural language processing of the structured data that describe relationships within the structured data and comprise descriptions generated through fact extraction from the unstructured data that describe relationships between extracted facts and portions of the structured data;
generate a data structure representable as a graph that comprises vertices and edges using at least a portion of the data, wherein each of the vertices represents one of the entities or one of the measurements, wherein the edges represent the relationships between the vertices, wherein one or more of the vertices positioned at a center of the graph are representative of one or more geological formations, and wherein the edges disposed radially from the center of the graph and connecting corresponding vertices are representative of different geological formations, wellheads, wellbores, well completions, formation tops, reports, and fluid volumes at different hierarchy levels; and
generate a query result using the data structure responsive to receipt of a query, wherein the query result depends at least in part on one or more of the descriptions that describe the relationships between the vertices.

18. The method of claim 1, wherein the entities comprise one or more of formation entities, wellbore entities and completion entities.

19. The method of claim 1, wherein the measurements comprise one or more of oil measurements, water measurements, gas measurements and downhole log measurements.

20. The method of claim 1, wherein the entities comprise wellbores and formations and wherein the measurements comprise fluid production measurements from one or more of the formations as produced via one or more of the wellbores.

* * * * *